United States Patent
Chopra et al.

(10) Patent No.: US 11,955,016 B2
(45) Date of Patent: Apr. 9, 2024

(54) INTERFACE SYSTEM FOR FLIGHT DECK COMMUNICATIONS

(71) Applicant: The Boeing Company, Chicago, IL (US)

(72) Inventors: Seema Chopra, Bengaluru (IN); Kiran Gopala Krishna, Bangalore (IN); Rajiv Veeranna, Bangalore (IN)

(73) Assignee: THE BOEING COMPANY, Chicago, IL (US)

( * ) Notice: Subject to any disclaimer, the term of this patent is extended or adjusted under 35 U.S.C. 154(b) by 276 days.

(21) Appl. No.: 17/574,167

(22) Filed: Jan. 12, 2022

(65) Prior Publication Data

US 2022/0309928 A1    Sep. 29, 2022

Related U.S. Application Data

(60) Provisional application No. 63/166,511, filed on Mar. 26, 2021.

(51) Int. Cl.
| | | |
|---|---|---|
| B64D 45/00 | (2006.01) | |
| G06F 40/284 | (2020.01) | |
| G08G 5/00 | (2006.01) | |
| G10L 15/22 | (2006.01) | |

(52) U.S. Cl.
CPC ............. *G08G 5/003* (2013.01); *B64D 45/00* (2013.01); *G06F 40/284* (2020.01); *G08G 5/0021* (2013.01); *G10L 15/22* (2013.01); *B64D 2045/007* (2013.01)

(58) Field of Classification Search
CPC .... G08G 5/003; G08G 5/0021; G06F 40/284; B64D 45/00; B64D 2045/007; G10L 15/22
See application file for complete search history.

(56) References Cited

U.S. PATENT DOCUMENTS

| | | | |
|---|---|---|---|
| 2012/0066617 | A1 | 3/2012 | Gupta et al. |
| 2020/0044992 | A1 | 2/2020 | Kumar et al. |

FOREIGN PATENT DOCUMENTS

EP    3474259 A1    4/2019

OTHER PUBLICATIONS

Extended European Search Report dated Aug. 17, 2022 for European Patent Application No. 22164129.3, 8 pages.

*Primary Examiner* — Mathew Franklin Gordon
(74) *Attorney, Agent, or Firm* — Sage Patent Group

(57) ABSTRACT

An interface system for flight deck communications includes a chatbot configured to perform a conversation with a pilot. The conversation includes speech communications, visual communications using a display, or both. The interface system also includes a dynamic conversational graph generator. The dynamic conversational graph generator is configured to perform a set of functions including determining a flight operational procedure from the conversation with the pilot. The set of functions also include providing information associated with the flight operational procedure to the chatbot for communicating to the pilot. The set of functions also include responding to any requests received from the pilot by the chatbot during the conversation with the pilot.

20 Claims, 17 Drawing Sheets

![Fig. 4B]

| TOKEN (KEYWORD SPOTTED/ HIGH PROBABILITY SCORED BIGRAM LIST) | LRU NAME(S) | FEATURE FUNCTION | MNEMONIC SOP PARAMETERS | API/QUERY (THAT IS ALREADY BUILT BETWEEN SUBSYSTEMS) | ALTERNATE STEPS - INDEX TO ALTERNATE PATHS |
|---|---|---|---|---|---|
| | | | data | func(data) | |
| DIRECT TO | FMS | LNAV | Waypoint ID/Lat, Lon | DirectTo(lat,lon) | |
| FUEL (NOUNS) (VERBS) | FQPU | FUEL QUANTITY | FUEL TANK QTY | GetFuel(qty, tank) | TransferFuel (qty,from,to) |
| | | | | GetFuel(qty, tank) | Sd |
| APPROACH_CHECKLIST | DISPLAY SYSTEM | ELECTRONIC CHECKLIST | APPROACH_CHECKLIST | getApproachChecklist() | NORM: 2 ALT 3 |
| | | | 2. LANDING_LIGHT_ON | getLandingLightsState() | NORM: 3 |
| | | | 3. THROTTLE_SETTING | getThrottlePosition(); | NORM: 4 |
| | | | 4. ... | ... | ... |
| | | ELECTRONIC CHARTS | AIRPORT_VALUE | getChart(airport); | show/Chart(Type); |
| | | NAVIGATION PAGES | MAP_MODE | SetChartode(); /*night/day*/ getMapMode(); | changeChart(type); /*start/sid/appr/arr~/ setMapMode(); |
| | | | | showWeatherLayer(value : [T/F]); | setRange(rangeValue); |
| | | | | showTraffic(truefalsevalue); | setRange(rangeValue); |
| | | PRIMARYDISPLAY | NAVCOM_FREQUENCY | setRadioFrequency(Frequency/Value) | setBackUpFreq(FreqVal); |
| | | | | set Mode(Full Rev) | |
| | | | | setRangeHSI(RangeVal); | |

136C — ELECTRONIC CHECKLIST
419 — APPROACH CHECKLIST
420
418
140
422
410

FIG. 4B

| PILOT — 103 | CHATBOT — 102 | FUNCTION (SYSTEM DIRECTED CONVERSATION/COCKPIT DISPLAY) — 136 |
|---|---|---|
| | "CHECK LANDING LIGHTS AND SWITCH TO ON" | PRESENT CHECKLIST ON DISPLAY. — 612 |
| PILOT SWITCHED ON LANDING LIGHTS "LANDING LIGHTS ON" | | VERIFY LANDING LIGHTS ARE SWITCHED ON - PRESENT CONFIRMATION ON DISPLAY — 614 |
| | "SET ALTIMETER TO QFE" | — 602 |
| | "ALTIMETER SET TO THE AIRPORT FIELD ELEVATION OF (ALTIMETER SETTING READ BACK)" | VERIFY ALTIMETER SETTING. PRESENT ALTIMETER SETTING ON DISPLAY — 616 |
| PILOT SETS ALTIMETER "ALTIMETER SETTING DONE." | | |
| | "TUNE THE NAVIAGTION RADIOS" | |
| | "NAV RADIOS TUNED TO FREQUENCIES (FREQUENCIES OF NAV RADIOS READBACK)" | READ NAVIGATION FREQUENCIES OF NAVIGATION RADIOS — 618 |
| PILOT TUNES NAVIGATION RADIOS "NAVIGATION RADIOS TUNED." | | |
| | "CHECK IF APPROACH LOCALIZER IS ACTIVE." | |

FIG. 6B

INTERFACE SYSTEM FOR FLIGHT DECK COMMUNICATIONS

CROSS-REFERENCE TO RELATED APPLICATIONS

This application claims the benefit of priority of U.S. Provisional Application No. 63/166,511, filed Mar. 26, 2021, which is incorporated herein by reference in its entirety.

FIELD

The present disclosure relates to aircraft and other vehicles and more particularly to an interface system for flight deck communications.

BACKGROUND

During operation of an aircraft, flight crews need to interface with the different systems of the aircraft, monitor equipment onboard the aircraft, access information, communicate with air traffic controllers, and respond to different events during all phases of a flight among other tasks involved in flying an airplane. Accessing information, monitoring equipment, and responding to certain occurrences, along with actually flying the airplane, can be hectic at times, particularly during high workload situations for the crew. Accordingly, there is a need for systems that reduce pilot workload, improve situational awareness, and allow the crew to focus on actual operation and navigation of the aircraft.

SUMMARY

In accordance with an example, an interface system for flight deck communications includes a chatbot configured to perform a conversation with a pilot. The conversation includes speech communications, visual communications using a display, or both. The interface system also includes a dynamic conversational graph generator configured to perform a set of functions. The set of functions includes determining a flight operational procedure from the conversation with the pilot; providing information associated with the flight operational procedure to the chatbot for communicating to the pilot; and responding to any requests received from the pilot by the chatbot during the conversation with the pilot.

In accordance with another example, a method for flight deck communications includes performing, by a chatbot, a conversation with a pilot, wherein the conversation includes speech communications, visual communications using a display, or both. The method also includes determining, by a dynamic conversational graph generator, a flight operational procedure from the conversation with the pilot. The method additionally includes providing, by the dynamic conversational graph generator, information associated with the flight operational procedure to the chatbot for communicating to the pilot. The method further includes responding, by the dynamic conversational graph generator, to any requests from the pilot received by the chatbot during the conversation with the pilot.

In accordance with an example and any of the preceding examples, the interface system and method further include a tokenizer. The tokenizer is configured to: convert text received from the chatbot to tokens transmitted by the tokenizer; and convert tokens received by the tokenizer to text that is transmitted to the chatbot to perform the conversation with the pilot.

In accordance with an example and any of the preceding examples, the set of functions performed by the dynamic conversational graph generator further includes: detecting a keyword in the conversation with the pilot using the tokens from the tokenizer, wherein the keyword identifies a particular flight operational procedure; searching a plurality of nodes of a dynamic conversational graph to identify a node corresponding to the keyword in the conversation with the pilot, wherein each node corresponds to a different flight operational procedure; handing-off communications to a system directed conversation module in response to the node corresponding to the keyword having an owner, wherein the owner is a particular aircraft system associated with the flight operational procedure; and determining an identification of any neighboring nodes in the dynamic conversational graph to the node corresponding to the keyword in response to the node not having an owner, wherein the identification of any neighboring nodes are communicated to the pilot by the chatbot in the conversation.

In accordance with an example and any of the preceding examples, the interface system and the method further include a system directed conversation module configured to provide certain tokens including particular information associated with the flight operational procedure to the tokenizer in response to the flight operational procedure being associated with a particular aircraft system of a plurality of aircraft systems. The dynamic conversational graph generator is configured to handoff communications to the system directed conversation module in response to the flight operational procedure being associated with the particular aircraft system.

In accordance with an example and any of the preceding examples, the interface system and the method further include a command encoder/decoder configured to: receive and execute formatted instructions related to the flight operational procedure from the system directed conversation module for communications with the particular aircraft system of the plurality of aircraft systems; and decode the particular information from the particular aircraft system into a set of responses for communications with the system directed conversation module.

In accordance with an example and any of the preceding examples, the interface system and method further include a dynamic widget/form generator configured to perform a set of functions including: receiving the tokens from the tokenizer, or a controller-pilot data link communications (CPDLC)/Aircraft Communication Addressing and Reporting System (ACARS) text analyzer that receives text; and generating a particular form, widget or both in response to the tokens.

In accordance with an example and any of the preceding examples, the interface system and method further include a dynamic widget/form generator configured to generate a particular form, widget or both associated with the flight operational procedure for presentation in a window on a display. The particular form, widget or both are configured for interaction with the pilot.

In accordance with an example and any of the preceding examples, the interface system and method, wherein a visual positioning or alignment of the particular form, widget or both associated with the flight operational procedure is correlated to a corresponding visual chatbot conversational text.

In accordance with an example and any of the preceding examples, the interface system and method, wherein pilot interaction with the particular form, widget or both includes at least one of interaction by conversing with the chatbot or interaction by the pilot touching a feature of the particular form, widget, or both.

In accordance with an example and any of the preceding examples, the interface system and method further include an automatic speech recognition device configured to receive speech from the pilot and to convert the speech to text for transmission to the chatbot. The interface system and method additionally include a text-to-speech converter configured to receive text from the chatbot and to convert the text to speech for transmission to the pilot by a speaker, wherein the speaker is in a flight deck or a headset of the pilot.

In accordance with an example and any of the preceding examples, the interface system or method wherein the chatbot is configured to perform the conversation with the pilot using at least one of an audio panel in a flight deck, a cockpit display in the flight deck, or a portable electronic device.

The features, functions, and advantages that have been discussed can be achieved independently in various examples or may be combined in yet other examples further details of which can be seen with reference to the following description and drawings.

BRIEF DESCRIPTION OF THE DRAWINGS

FIG. 4B is an illustration of an example of a database for use by the system directed conversation module in accordance with an example of the present disclosure.

FIGS. 6A-6B are a table illustrating an example of performance of a conversation with a pilot in accordance with an example of the present disclosure.

DETAILED DESCRIPTION

Figure 1:
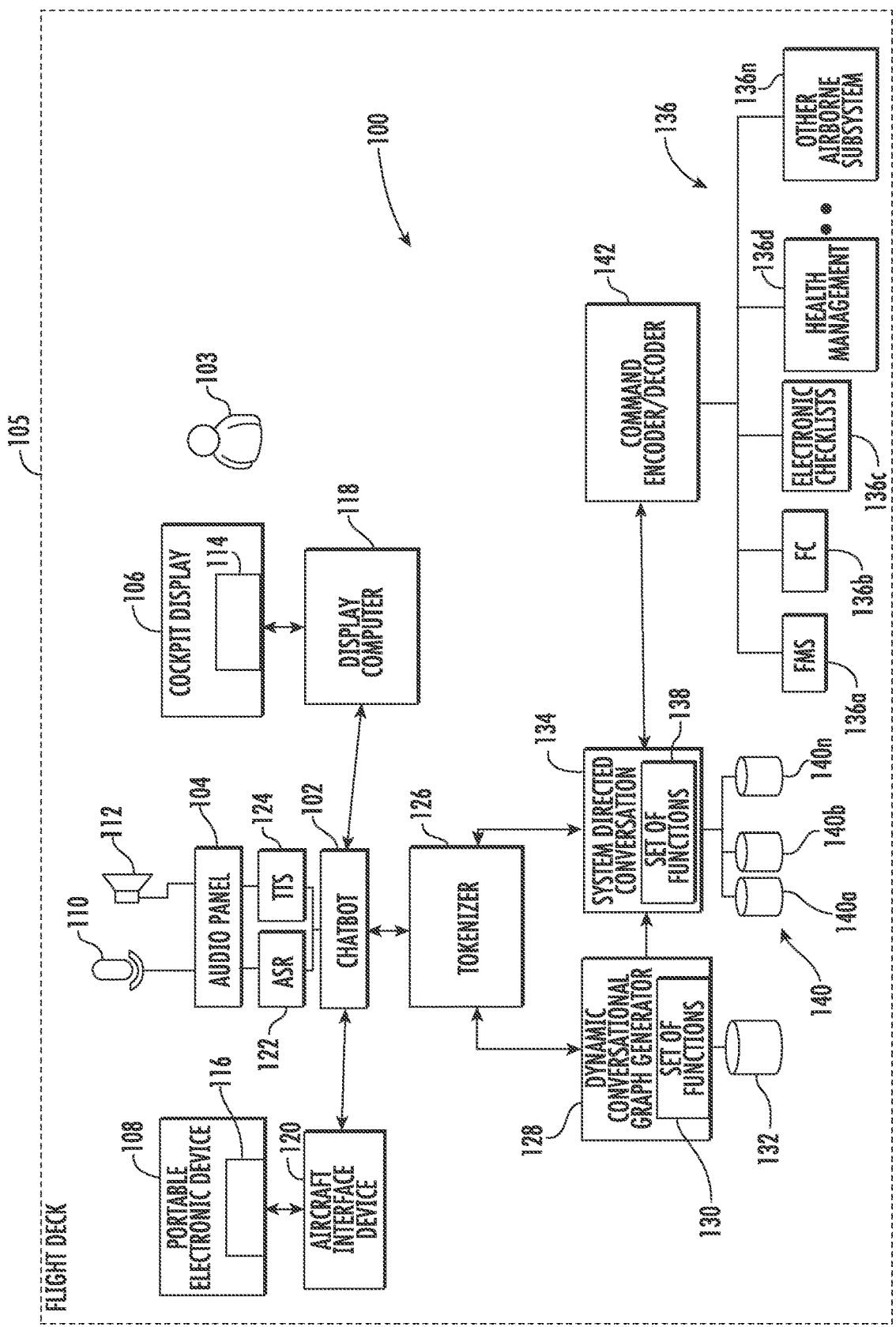
FIGS. 1 and 2 are a block schematic diagram of an example of an interface system for flight deck communications in accordance with an example of the present disclosure.

The following detailed description of examples refers to the accompanying drawings, which illustrate specific examples of the disclosure. Other examples having different structures and operations do not depart from the scope of the present disclosure. Like reference numerals may refer to the same element or component in the different drawings.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In accordance with some examples of the present disclosure, an interface system for flight deck communications includes a chatbot configured to perform a conversation with a pilot. The conversation includes speech communications or audio communications, visual communications using a display or interactive touchscreen, or both. The interface system includes a dynamic conversational graph generator configured to perform a set of functions. The set of functions includes but is not limited to determining a flight operational procedure from the conversation with the pilot; providing information associated with the flight operational procedure to the chatbot for communicating to the pilot; and responding to any requests received from the pilot by the chatbot during the conversation with the pilot. In some examples, the interface system also includes a tokenizer configured to convert text received from the chatbot to tokens which are transmitted by the tokenizer and to convert tokens received by the tokenizer to text that is transmitted to the chatbot to perform the conversation with the pilot.

In some examples, the interface system also includes a system directed conversation module configured to direct the conversation with the pilot to a particular aircraft system associated with the flight operational procedure. The dynamic conversational graph generator is configured to handoff communications to the system directed conversation module in response to the flight operational procedure being associated with the particular aircraft system of a plurality of aircraft systems.

In some examples, the interface system also includes a dynamic widget/form generator configured to generate a particular form, widget or both associated with the flight operational procedure for presentation in a window on a display. The particular form, widget or both are configured for interaction with the pilot. Pilot interaction with the particular form, widget or both includes but is not limited to at least one of interaction by conversing with the chatbot or interaction by the pilot touching a feature of the particular form, widget, or both on a display. Examples of the display include but are not limited to a touchscreen cockpit display in the flight deck or a display of a portable electronic device. Accordingly, the examples of interface systems for flight deck communications described herein reduce pilot workload, improve situational awareness, and allow the crew to focus on actual operation and navigation of the aircraft.

Figure 2:
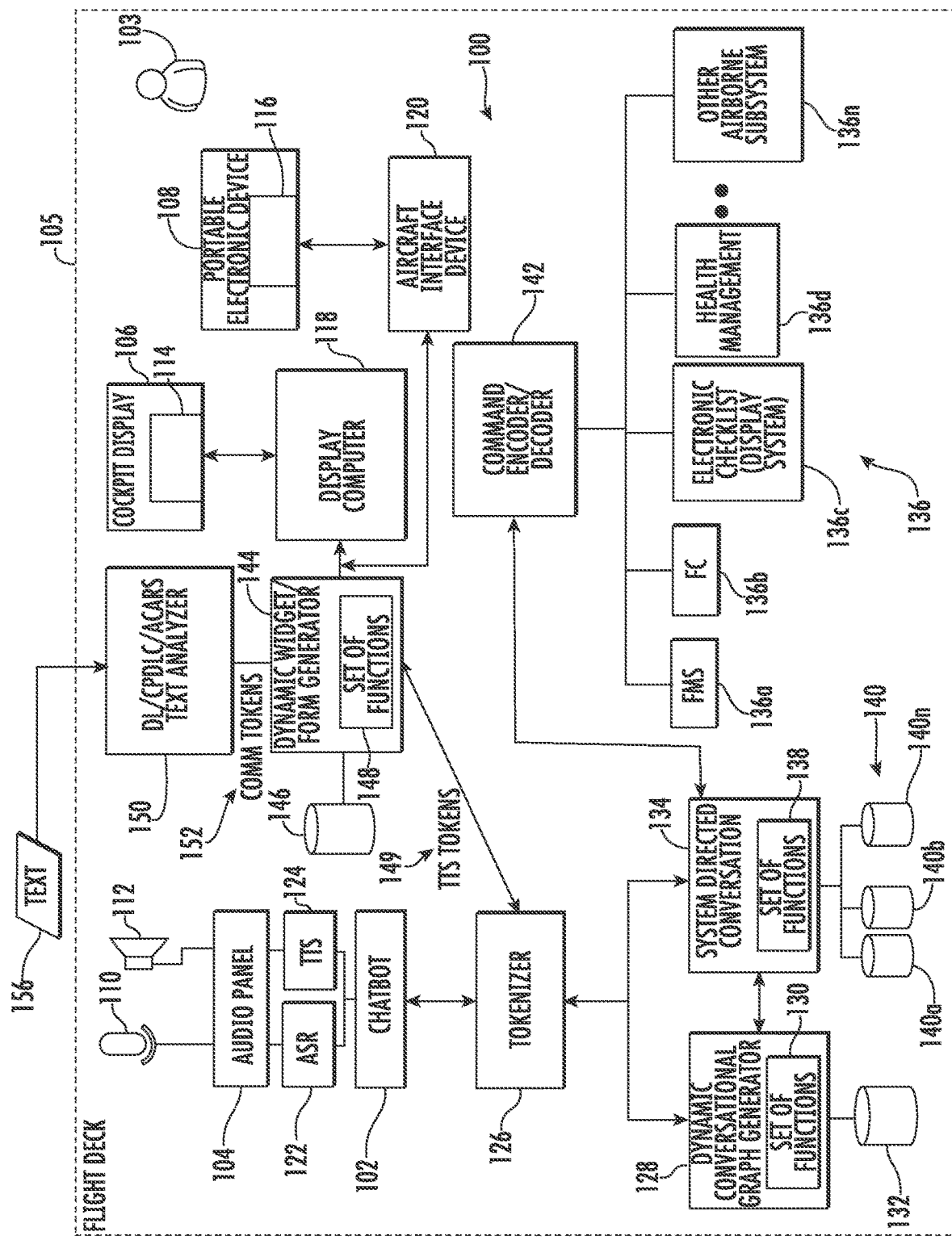

FIGS. 1 and 2 are a block schematic diagram of an example of an interface system 100 for flight deck communications in accordance with an example of the present disclosure. The interface system 100 includes a chatbot 102 configured to perform a conversation with a pilot 103. The conversation includes speech or audio communications, visual communications using a display, or both. An example of performance of a conversation 602 between the chatbot 102 and a pilot 103 will be described with reference to FIGS. 6A-6B. The chatbot 102 is configured to perform the conversation 602 with the pilot 103 using at least one of an audio panel 104 in a flight deck 105, a cockpit display 106 in the flight deck 105, or a portable electronic device 108, such as a tablet computer, electronic flight bag (EFB) or similar device. The audio panel 104 includes a microphone 110 to receive speech or audio signals from the pilot 103 and a speaker 112 to transmit speech or audio signals to the pilot 103. In some examples, the cockpit display 106 includes a touchscreen 114 configured to receive inputs by the pilot 103 touching the cockpit display 106 as described herein. The portable electronic device 108 also includes a touchscreen 116 configured to receive inputs by touch.

In the examples in FIGS. 1 and 2, a display computer 118 interconnects the chatbot 102 to the cockpit display 106. The display computer 118 is configured to convert text signals from the chatbot 102 to video signals for presentation on the cockpit display 106 and to convert input signals entered by the pilot 103 into the touchscreen 114 into text signals that are usable by the chatbot 102.

In the examples in FIGS. 1 and 2, an aircraft interface device 120 interconnects the chatbot 102 to the portable electronic device 108. The aircraft interface device 120 is configured to convert text signals from the chatbot 102 to video signals for presentation on the portable electronic device 108 and to convert input signals entered by the pilot into the touchscreen 116 into text signals that are usable by the chatbot 102.

The interface system 100 also includes an automatic speech recognition (ASR) device 122 configured to receive speech from the pilot 103 by the microphone 110 and to covert the speech to text for transmission to the chatbot 102. The interface system 100 additionally includes a text-tospeech (TTS) converter 124 configured to receive text from the chatbot 102 and to convert the text to speech or audio for transmission to the pilot 103 by the speaker 112. The speaker 112 is in the flight deck 105 or a headset of the pilot 103.

The interface system 100 further includes a tokenizer 126 configured to convert text received from the chatbot 102 to tokens transmitted by the tokenizer 126 and to convert tokens received by the tokenizer 126 to text that is transmitted to the chatbot 102 to perform the conversation 602 with the pilot 103. The tokenizer 126 breaks-up sentences or a sequence of words or phrases spoken by the pilot 103 into pieces, such as words, keywords, phrases, symbols or other elements called tokens. Tokens can be individual words, phrases or a whole sentence.

Figure 3:
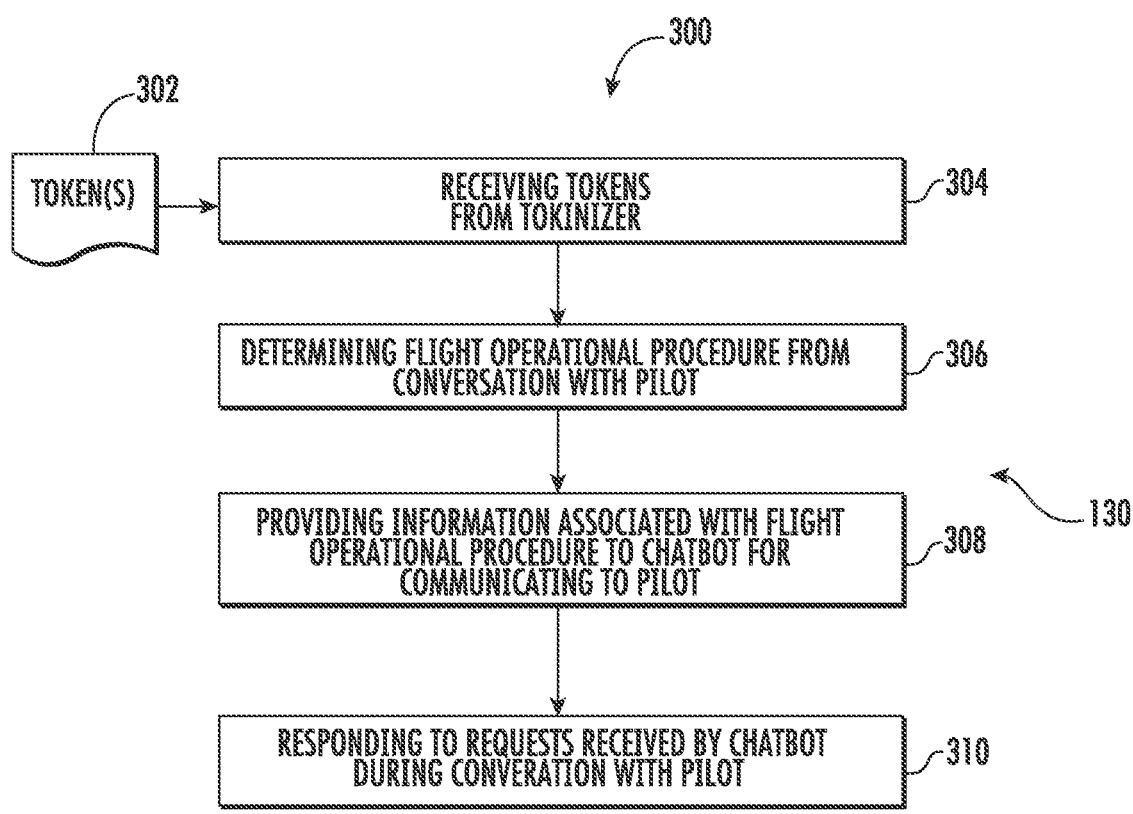
FIG. 3 is a flow chart of an example of a method of operation of a dynamic conversational graph generator in accordance with an example of the present disclosure.

The interface system 100 also includes a dynamic conversational graph generator 128 configured to perform a set of functions 130. Referring also to FIG. 3, FIG. 3 is a flow chart of an example of a method 300 of operation of the dynamic conversational graph generator 128 in accordance with an example of the present disclosure. The exemplary method 300 includes an example of the set of functions 130. The method 300 or set of functions 130 includes but is not limited to: receiving, in block 304, one or more tokens 302 corresponding to the conversation 602 with the pilot 103 from the tokenizer 126; determining, in block 306, a flight operational procedure from the tokens 302 corresponding to the conversation 602 with the pilot 103; providing, in block 308, information associated with the flight operational procedure to the chatbot 102 for communicating to the pilot 103; and responding, in block 310, to any requests received from the pilot 103 by the chatbot 102 during the conversation 602 with the pilot 103. Examples of additional functions of the set of functions 130 performed by the dynamic conversational graph generator 128 will be described with reference FIGS. 5A-5C and FIGS. 6A-6B.

Figure 6A:
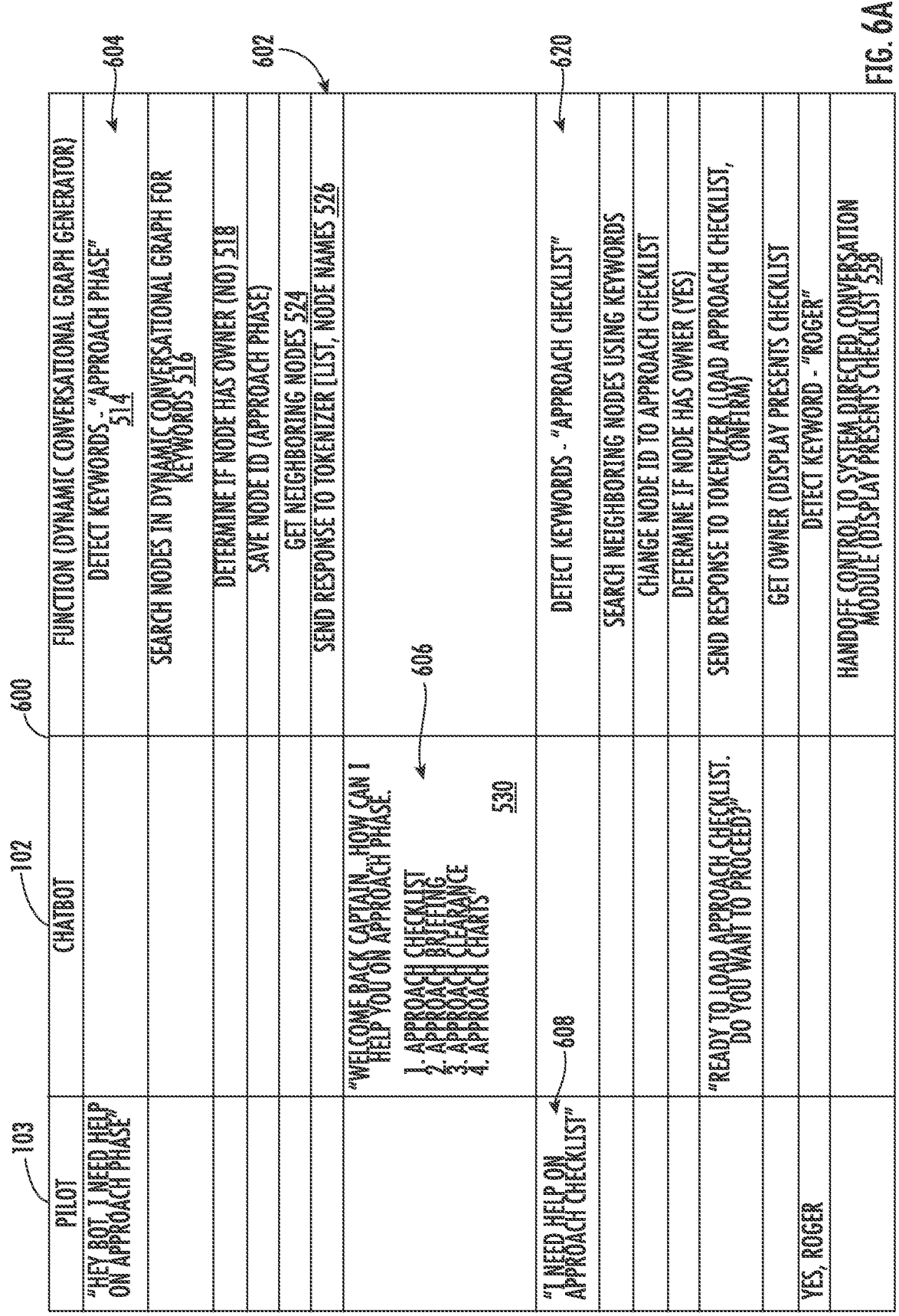
Figure 7:
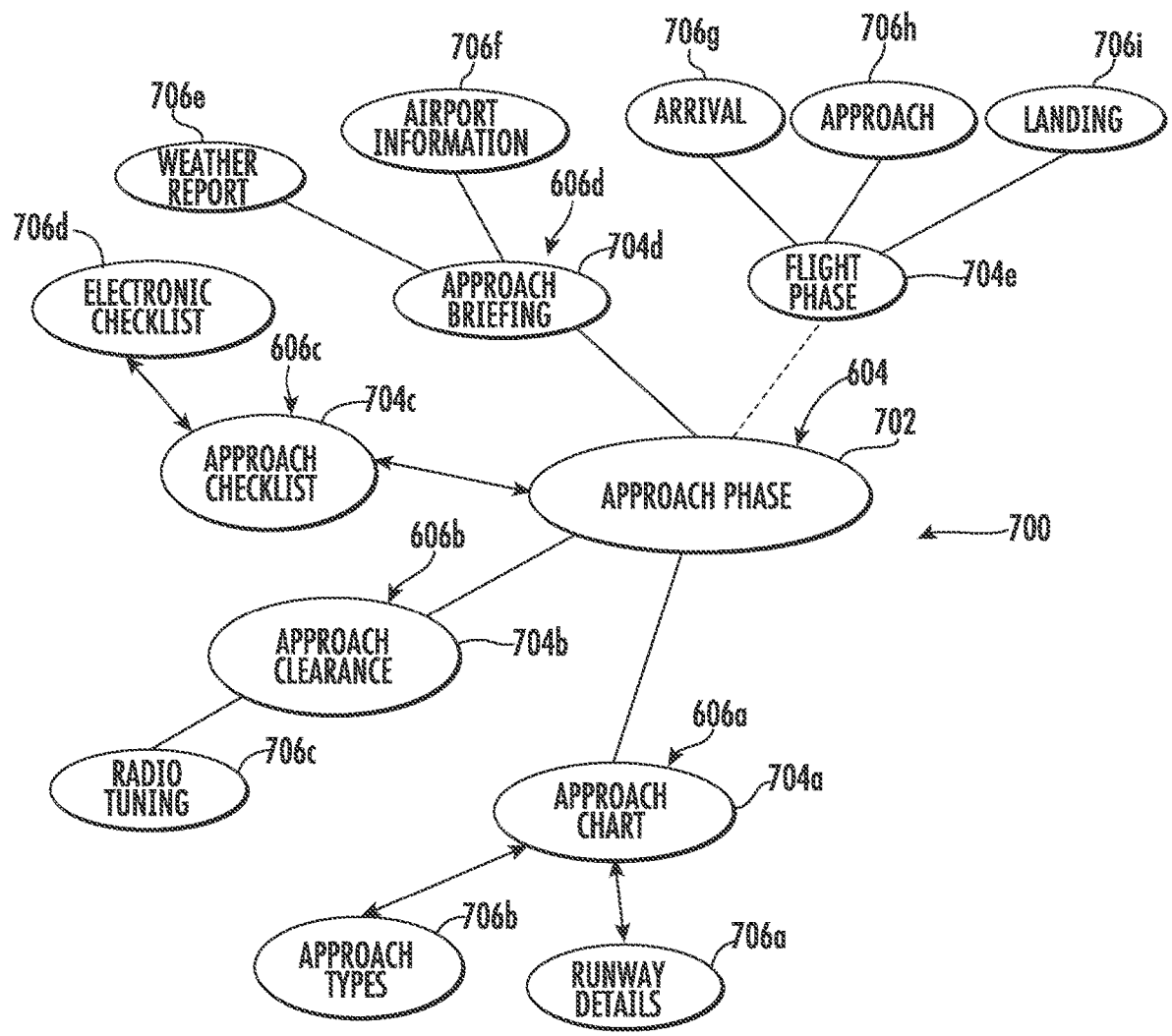
FIG. 7 is an example of a dynamic conversational graph in accordance with an example of the present disclosure.

The dynamic conversational graph generator 128 accesses a historical/trained conversation database 132 to perform the set of functions 130. An example of a method 1000 for generating a historical/trained conversation database 132 will be described with reference to FIG. 10. The historical/trained conversation database 132 includes historical information and/or is trained to form dynamic conversational graphs for performing a conversation with the pilot 103, e.g., exemplary conversation 602 (FIGS. 6A-6B). An example of a dynamic conversational graph 700 is illustrated in FIG. 7 and is useable for performance of a conversation, such as the exemplary conversation 602 in FIGS. 6A-6B.

The interface system 100 further includes a system directed conversation module 134 configured to direct the conversation with the pilot 103 to a particular aircraft system 136 associated with the flight operational procedure. As used herein, an aircraft system 136 also includes a subsystem of an aircraft system 136. The system directed conversation module 134 is configured to provide certain tokens including particular information associated with the flight operational procedure to the tokenizer 126 in response to the flight operational procedure being associated with a particular aircraft system 136 of a plurality of aircraft systems 136a-136n. The dynamic conversational graph generator 128 is configured to handoff communications to the system directed conversation module 134 in response to the flight operational procedure being associated with the particular aircraft system 136. Examples of the aircraft systems 136a-136n include but are not limited to a flight management system (FMS) 136a, a flight computer (FC) 136b, electronic checklists 136c performed by a display system, a health management system 136d, and other airborne systems 136n or subsystems.

Figure 4A:
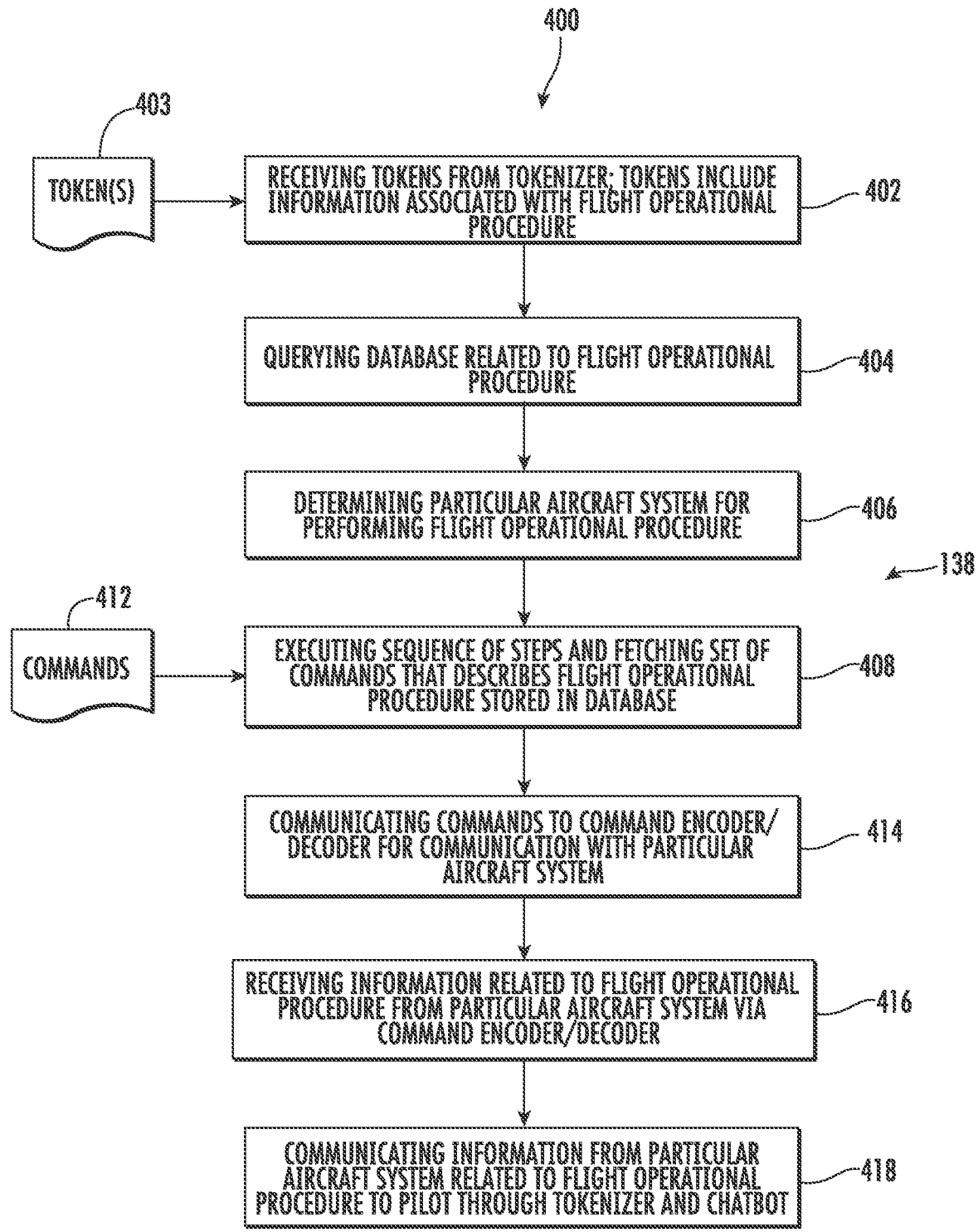
FIG. 4A is a flow chart of an example of a method of operation of a system directed conversation module in accordance with an example of the present disclosure.

The system directed conversation module 134 is configured to perform a set of functions 138. Referring also to FIG. 4A, FIG. 4A is a flow chart of an example of a method 400 of operation of a system directed conversation module 134 in accordance with an example of the present disclosure. The exemplary method 400 includes an example of the set of functions 138. The method 400 or set of functions 138 includes but is not limited to the functions described with reference to blocks 402-416. In block 402, the method 400 or set of functions 138 includes receiving one or more tokens 403 from the tokenizer 126. The tokens 403 include information associated with the flight operational procedure.

In block 404, the method or set of functions 138 includes querying a database 140 related to the flight operational procedure by the system directed conversation module 134 using the tokens 403. An example of a database 140 for use by the system directed conversation module 134 will be described with reference to FIG. 4B.

In block 406, the method 400 or set of functions 138 includes determining the particular aircraft system 136 of the plurality of aircraft systems 136a-136n for performing the flight operational procedure.

In block 408, the method 400 or set of functions 138 includes executing a sequence of steps 410 (FIG. 4B) associated with the flight operational procedure and fetching a set of commands 412 that describes the flight operational procedure stored in the database 140.

In block 414, the method 400 or set of functions 138 includes communicating the commands 412 by the system directed conversation module 134 to the command encoder/decoder 142 for communication with the particular aircraft system 136. The particular aircraft system 136 is configured to perform the commands 412 and return information related to the flight operational procedure similar to that described with reference to the examples in FIGS. 6A-6B and FIGS. 9A-9B.

In block 416, the method 400 or set of functions 138 include receiving information related to the flight operational procedure by the system directed conversation module 134 from the particular aircraft system via the command encoder/decoder 142.

In block 418, the method 400 or set of functions 138 includes communicating information related to the flight operational procedure by the system directed conversation module 123 to the pilot 103 through the tokenizer 126 and the chatbot 102.

In some examples, the database 140 includes one or more subsystem specific speech/TTS databases 140a-140n. The database 140 is created for the desired flight operational procedures and is field loadable. Referring also to FIG. 4B, FIG. 4B is an illustration of an example of a database 140 for use by the system directed conversation module 134 in accordance with an example of the present disclosure. The exemplary database 140 illustrated in FIG. 4B includes an example of a sequence of steps 410 for presenting an approach checklist 419 by an electronic checklist 136c on a display system 420, e.g., the cockpit display 106, portable electronic device 108, or both. The database 140 is used by the system directed conversation module 134 in translation of tokens 403 into the sequence of steps 410 which contains mnemonics/opcode and operands/formatted instructions 422 which the command encoder/decoder 142 is configured to interpret. The response from the command encoder/decoder 142 is used by the system directed conversation module 134 to fetch the tokens from the database 140 and forward the tokens to the tokenizer 126 for communication in the conversation 602 with the pilot 103.

Referring back to FIGS. 1 and 2, the interface system 100 further includes a command encoder/decoder 142. The command encoder/decoder 142 is configured to receive and execute the mnemonics/opcode and operands/formatted instructions from the system directed conversation module 134. Thereby, the command encoder/decoder 142 encodes and communicates avionics data with the particular aircraft system 136 of the plurality of the systems 136a-136n, as illustrated in FIGS. 1 and 2. The command encoder/decoder 142 is also configured to decode the particular information from the particular aircraft system 136 of the plurality of aircraft systems 136a-136n into a set of responses for communication with the system directed conversation module 134 and execution of the set of functions 138.

Referring to FIG. 2, the interface system 100 further includes a dynamic widget/form generator 144 configured to generate a particular form, widget or both associated with the flight operational procedure for presentation in a window of a display, e.g., the cockpit display 106, display of the portable electronic device 108, or both. The dynamic widget/form generator 144 uses a keyword/phrase to dynamic forms/widgets database 146 to generate the particular form, widget or both. An example of a method 800 of operation of the dynamic widget/form generator 144 and using the keyword/phrase to dynamic forms/widgets database 146 to generate a particular form, widget or both will be described with reference to FIG. 8 and FIGS. 9A and 9B. The particular form, widget or both are configured for interaction with the pilot 103. As shown in the example in FIG. 2, the dynamic widget/form generator 144 is coupled to cockpit display 106 by the display computer 118. The cockpit display 106 is also coupled to the chatbot 102 as previously described and shown in FIG. 1 The display computer 118 is configured to convert signals from the dynamic widget/form generator 144 to video signals for presentation on the cockpit display 106 and to convert input signals entered by the pilot 103 into the touchscreen 114 into signals that are usable by the dynamic widget/form generator 144 for communication with a particular aircraft system 136, using the tokenizer 126, system directed conversation module 134 and command encoder/decoder 142.

The dynamic widget/form generator 144 is coupled to the portable electronic device 108 by the aircraft interface device 120. The portable electronic device 108 is also coupled to the chatbot 102 as previously described and shown in FIG. 1. The aircraft interface device 120 is configured to convert signals from the dynamic widget/form generator 144 to video signals for presentation on the portable electronic device 108 and to convert input signals entered by the pilot 103 into the touchscreen 116 into signals that are usable by the dynamic widget/form generator 144 for communication with a particular aircraft system 136 using the tokenizer 126, system directed conversation module 134 and command encoder/decoder 142.

In some examples, the dynamic widget/form generator 144 is configured to perform a set of functions 148 including but not limited to receiving tokens 149 from the tokenizer 126, or receiving tokens 152 from a data link/controller-pilot data link communications (DL/CPDLC)/Aircraft Communications Addressing and Reporting System (ACARS) text analyzer 150 that receives text 156; and generating a particular form, widget or both in response to the tokens 149 or 152. The DL/CPDLC/ACARS text analyzer 150 receives the text 156 from a ground station or other source.

An example of a method 800 of operation of the dynamic widget/form generator 144 will be described with reference to FIG. 8. Examples of a form, widget or both presented in a window 904a-904d of a display 900 are illustrated in FIGS. 9A-9B and will be described with reference to FIGS. 9A-9B. A visual positioning or alignment of a particular form, widget or both associated with a flight operational procedure is correlated to a corresponding visual chatbot conversational text 905 as illustrated in FIGS. 9A-9B. The pilot interaction with the particular form, widget or both includes at least one of interaction by conversing with the chatbot 102 or interaction by the pilot 103 touching a feature of the particular form, widget, or both, on a touchscreen 114 or 116 as described with reference to FIG. 8 and FIGS. 9A-9B.

Figure 5A:
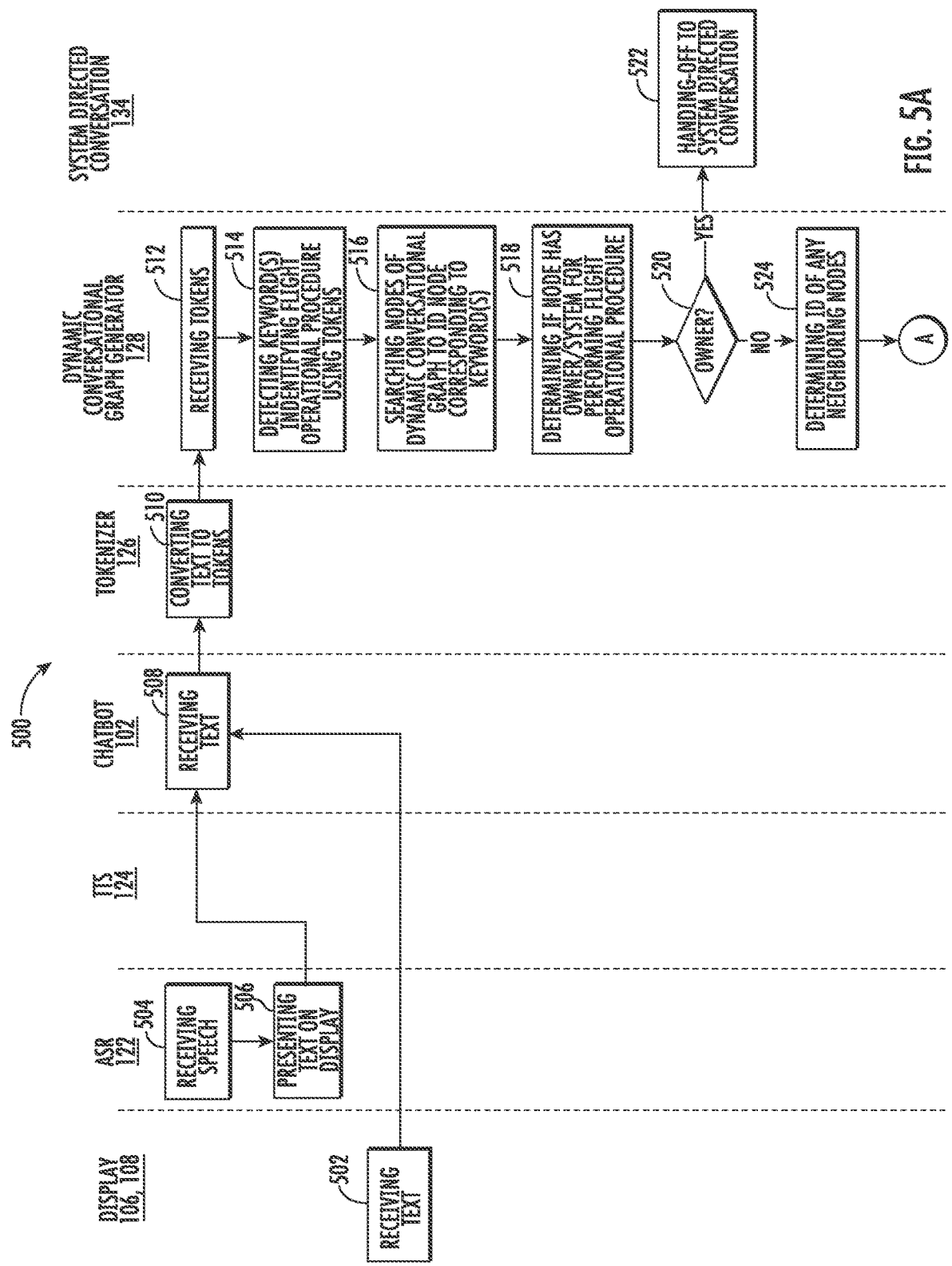
FIGS. 5A-5C are a flow chart of an example of a method of operation of the interface system in FIG. 1 and FIG. 2 in accordance with an example of the present disclosure.
Figure 5B:
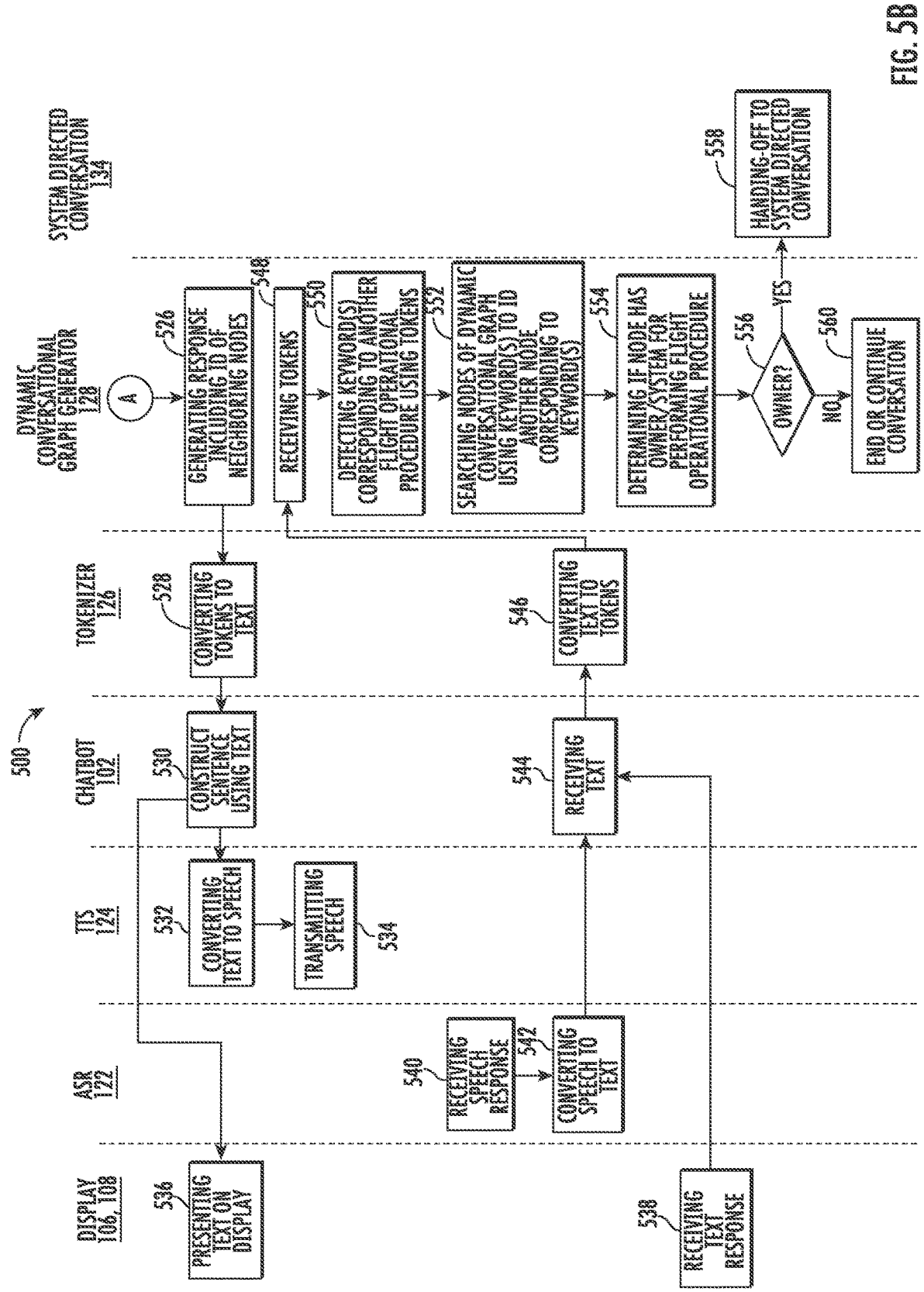
Figure 5C:
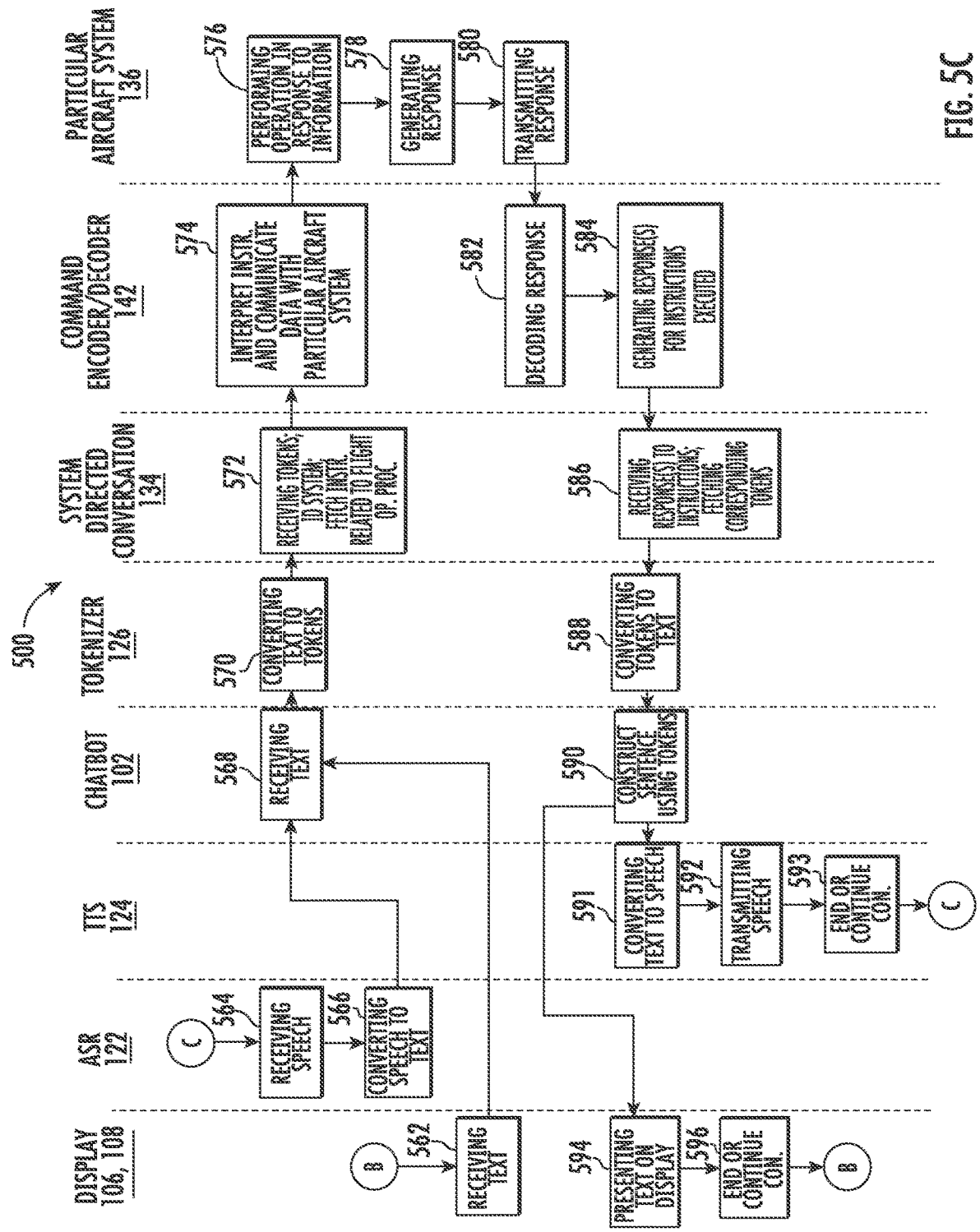

FIGS. 5A-5C are a flow chart of an example of a method 500 of operation of the interface system 100 in FIGS. 1 and 2 in accordance with an example of the present disclosure. The flow chart is divided into functions or operations that are performable by the different components in FIGS. 1 and 2. In some examples, the set of functions 130 performable by the dynamic conversational graph generator 128 and the set of functions 138 performable by the system directed conversation module 134 are embodied in the method 500. In block 502, the method 500 includes receiving text by a display. In accordance with some examples, the text is received by the touchscreen 114 of the cockpit display 106 or the touchscreen 116 of the display of the portable electronic device 108 entered by the pilot 103 as previously described.

In addition, or alternatively to receiving text by the display, in block 504, the method 500 includes receiving speech from the pilot 103. In some examples, in block 506, the method 500 includes presenting text of the speech on the display.

In block 508, the method 500 includes receiving the text by the chatbot 102. In block 510, the method 500 includes converting the text to tokens by the tokenizer 126.

In accordance with some examples, the set of functions 130 performable by the dynamic conversational graph generator 128 includes blocks 512-526 and blocks 548-560 in FIG. 5B. In block 512, the method 500 or set of functions 130 includes receiving the tokens by the dynamic conversational graph generator 128.

Referring also to FIGS. 6A-6B, FIGS. 6A-6B are a table 600 illustrating an example of performance of a conversation 602 with a pilot 103 in accordance with an example of the present disclosure. In block 514 (FIG. 5A), the method 500 or set of functions 130 performed by the dynamic conversational graph generator 128 includes detecting a keyword 604 (FIG. 6A) or keywords in the conversation 602 with the pilot 103 using the tokens from the tokenizer 126. The keyword 604 identifies a particular flight operational procedure. In the example in FIG. 6A, the keyword 604 or keywords are "Approach Phase" which identifies the particular flight operational procedure.

Referring also to FIG. 7, FIG. 7 is an example of a dynamic conversational graph 700 in accordance with an example of the present disclosure. In block 516, the method 500 or set of functions 130 additionally includes searching a plurality of nodes 702-706 (FIG. 7) of a dynamic conversational graph 700 to identify a node 702 corresponding to the keyword 604 (FIG. 6A) in the conversation 602 with the pilot 103. Each node 702-706 of the dynamic conversational graph 700 corresponds to a different flight operational procedure. In the example in FIGS. 6A-6B and FIG. 7, the keyword 604 "Approach Phase" corresponds to the flight operational procedure node 702 in FIG. 7.

In block 518, the method 500 or set of functions 130 performed by the dynamic conversational graph generator 128 further includes determining if the node 702 corresponding to the flight operational procedure has an owner or particular aircraft system 136 for performing the flight operational procedure.

In block 520, the method 500 or set of functions 130 performed by the dynamic conversational graph generator 128 additionally includes handing-off (block 522) communications to the system directed conversation module 134 in response to the node 702 corresponding to the keyword 604 having an owner. The owner is a particular aircraft system 136 associated with the flight operational procedure or particular aircraft system 136 that performs the flight operational procedure. The method 500 or set of functions 130 advances to block 524 in response to the node 702 corresponding to the keyword 604 not having an owner.

In block 524, the method 500 or set of functions 130 performed by the dynamic conversational graph generator 128 further includes determining an identification of any neighboring nodes 704 in the dynamic conversational graph 700 to the node 702 corresponding to the keyword 604 in response to the node 702 not having an owner in block 520. In the example illustrated in FIG. 7, the neighboring nodes 704 to node 702 corresponding to the keyword 604 and flight operational procedure include the identifications 606: "Approach Chart" 606a (neighboring node 704a), "Approach Clearance" 606b (neighboring node 704b), "Approach Checklist" 606c (neighboring node 704c), and "Approach Briefing" 606d (neighboring node 704d). The identifications 606 of the neighboring nodes 704 are communicated to the pilot 103 by the chatbot 102 in the conversation 602 as illustrated in the example conversation in FIG. 6A and block 526 of FIG. 5B.

In block 526, the method 500 or set of functions 130 performed by the dynamic conversational graph generator 128 includes generating a response including the identifications 606 of the neighboring nodes 704 in response to the node 702 corresponding to the keyword 604 and flight operational procedure having neighboring nodes 704a-704d. The response generated by the dynamic conversational graph generator 128 includes tokens each corresponding to the identifications 606a-606d of the neighboring nodes 704a-704d.

In block 528, the tokenizer 126 converts the tokens to text. In block 530, the chatbot 102 constructs one or more sentences using the text from the tokenizer 126 as illustrated in FIG. 6A. In block 532, the text-to-speech (TTS) converter 124 converts the text to speech. The speech is transmitted to the pilot 103 in block 532 by the speaker 112, or the text is presented on a display 106 or 108 in block 536, or both as illustrated in FIG. 5B. In performance of the conversation with the pilot 103, which was indicated at block 514 as including the dynamic conversational graph generator detecting a keyword or keywords "Approach Phase" in the conversation with the pilot using the tokens from the tokenizer, from which a node is identified corresponding to the keyword in the conversation that is determined to pertain to a particular aircraft system associated with the flight operational procedure, the dynamic conversational graph generator then generates a response that includes tokens corresponding to the identification that are converted by the tokenizer to construct one or more sentences that are output or transmitted to the pilot as speech and/or displayed on a display in the cockpit, such that the pilot can request an Approach checklist for display (which can further be confirmed by voice or an entry by the pilot using a touchscreen).

In the example in FIGS. 5A-5B and FIGS. 6A-6B, the conversation 602 with the pilot 103 continues similar to that previously described. In block 538, the method 500 includes receiving a text response by the display, e.g., the cockpit display 106 or display of the portable electronic device 108 entered by the pilot 103 using touchscreen 114 or 116. Alternatively, or in addition, in block 540, the method 500 includes receiving a speech response from the pilot 103 by the automatic speech recognition (ASR) device 122. The response 608 in the example in FIG. 6A is either a text response, speech response or both. In block 542, the ASR device 122 converts the speech to text.

In block 544, the method 500 includes receiving the text response 608 by the chatbot 102 from either the ASR device 122, display, or both. In block 546, the method 500 includes converting the text response 608 to tokens by the tokenizer 126.

In block 548, the method 500 includes receiving the tokens by the dynamic conversational graph generator 128. In block 550, the method 500 or set of functions 130 includes detecting another keyword 620 or keywords corresponding to another flight operational procedure in the response 608 from the pilot 103 using the tokens. In the example conversation 602 in FIG. 6A, the other keyword 620 or keywords are "Approach Checklist" in the response 608 from the pilot 103.

In block 552, the method 500 or set of functions 130 performed by the dynamic conversational graph generator 128 further includes searching the neighboring nodes 704a-704d of the dynamic conversational graph 700 to identify a certain neighboring node 704c corresponding to another keyword 620 or keywords during the conversation 602 with the pilot 103. In the example in FIG. 7, the keyword 620 "Approach Checklist" corresponds to neighboring node 704c.

In block 554, the method 500 or set of functions 130 further includes determining if the certain neighboring node 704c corresponding to the flight operational procedure "Approach Checklist" has an owner or aircraft system 136 for performing the flight operational procedure. In the example in FIG. 7, the neighboring node 704c has the owner node 706d "Electronic Checklist" which corresponds to the electronic checklist 136c performed by the display system in FIGS. 1 and 2.

In block 556, the method 500 or set of functions 130 includes handing-off (block 558) communications to the system directed conversation module 134 in response to the certain neighboring node 704c having an associated owner node 706d. Alternatively, the method 500 advances to block 560 in response to the certain neighboring node 704 not having an owner or aircraft system 136 for performing the flight operational procedure. In block 560, the conversation ends or continues in response to the pilot 103 continuing the conversation 602 by speech being received by the ASR device 122 and/or text being received by a display, e.g., cockpit display 106 or display of a portable electronic device 108.

FIG. 5C is an example of continuing the conversation using a particular aircraft system 136 in accordance with an example of the present disclosure. In block 562, the method 500 includes receiving text by a display. In accordance with some examples, the text is received by the touchscreen 114 of the cockpit display 106 or the touchscreen 116 of the display of the portable electronic device 108. In addition, or alternatively to receiving text by the display, in block 564, the method 500 includes receiving speech by the ASR device 122. In block 566, the ASR device 122 converts the speech to text. In some examples, the method 500 includes presenting text of the speech on the display.

In block 568, the method 500 includes receiving the text by the chatbot 102. In block 570, the method 500 includes converting the text to tokens by the tokenizer 126. In block 572, the method 500 includes receiving the tokens by the system directed conversation module 134 as illustrated in the example in FIG. 1. The tokens include information associated with the flight operational procedure from the conversation with the pilot 103. The system directed conversation module 134 is configured to identify, using the tokens, a particular aircraft system 136 for performing the flight operational procedure. In block 572, mnemonic/opcode and operand/formatted instructions related to the flight operational procedure are fetched by the system directed conversation module 134 from the database 140 as illustrated in the example in FIG. 1. The mnemonic/opcode and operand/formatted instructions are transmitted by the system directed conversation module 134 to the command encoder/decoder 142.

In block 574, the command encoder/decoder 142 is configured to receive and execute formatted instructions related to the flight operational procedure from the system directed conversation module for communications with a particular aircraft system 136 of the plurality of aircraft systems 136a-136n. The command encoder/decoder 142 is further configured to interpret the mnemonic/opcode and operand/formatted instructions and communicate avionics data with the particular aircraft system 136 of the plurality of aircraft systems 136a-136n for performing the flight operational procedure.

In block 576, the method 500 includes performing an operation by the particular aircraft system 136 in response to the encoded information. Examples of operations performed by a particular aircraft system 136 and communication with the pilot 103 are illustrated in the conversation 602 in the example in FIG. 6B. In the example in FIG. 6B, the particular aircraft system 136, e.g., a display system, includes presenting 612 a checklist on a display; verifying 614 landing lights are switched on by the pilot 103 and presenting confirmation on the display; verifying 616 an altimeter setting set by the pilot 103 and presenting the altimeter setting on the display; and reading 618 navigation frequencies of the navigation radios set by the pilot 103.

In block 578, the method 500 includes generating a response including any information or data by the particular aircraft system 136 for communication to the pilot 103. In block 580, the response is transmitted by the particular aircraft system 136 to the command encoder/decoder 142.

In block 582, the command encoder/decoder 142 is configured to decode the particular information from the particular aircraft system 136 into a set of responses for communications with the system directed conversation module 134. In block 584, the command encoder/decoder 142 generates one or more responses for the mnemonics/opcode-operands/formatted instructions that are executed by the particular aircraft system 136. The one or more responses are transmitted to the system directed conversation module 134. In block 586, the system directed conversation module 134 receives the response or responses to the mnemonics/opcode-operand/formatted instructions and fetches one or more corresponding tokens from the database 140. The system directed conversation module 134 transmits the one or more tokens to the tokenizer 126 as also illustrated in the example in FIG. 1 and FIG. 2. In block 588, converting the tokens to text is performed by the tokenizer 126. The tokenizer 126 transmits the text to the chatbot 102 for communication with the pilot 103.

In block 590, the chatbot 102 constructs one or more sentences using the tokens received from the tokenizer 126. Examples of sentences constructed by the Chatbot 102 during the exemplary conversation 602 with the pilot 103 are illustrated in FIG. 6B. The chatbot 102 transmits the one or more sentences to the TTS converter 124.

In block 591, converting the text in the sentences to speech is performed by the TTS converter 124. In block 592, transmitting the speech to the pilot 103 is performed by the TTS converter 124 using the speaker 112. In some examples, as previously described, the speaker 112 is mounted in an audio panel 104 in the flight deck 105, a headset worn by the pilot 103, or both. In block 593, the conversation 602 with the pilot 103 ends or the method 500 returns to block 564 to continue the conversation 602 and receive additional speech from the pilot 103. Referring also to FIG. 6B, FIG. 6B illustrates an example of the conversation 602 continuing between the pilot 103 and a particular aircraft system 136 using the chatbot 102, system directed conversation module 134 and command encoder/decoder 142.

In some example, in block 594 in FIG. 5C, the text or sentences from the chatbot 102 are also presented on a display, e.g., cockpit display 106, the display of the portable electronic device 108, or both. In block 596, the conversation 602 ends or the method 500 returns to block 562 for receiving additional text entered by the pilot 103 in the display.

Figure 8:
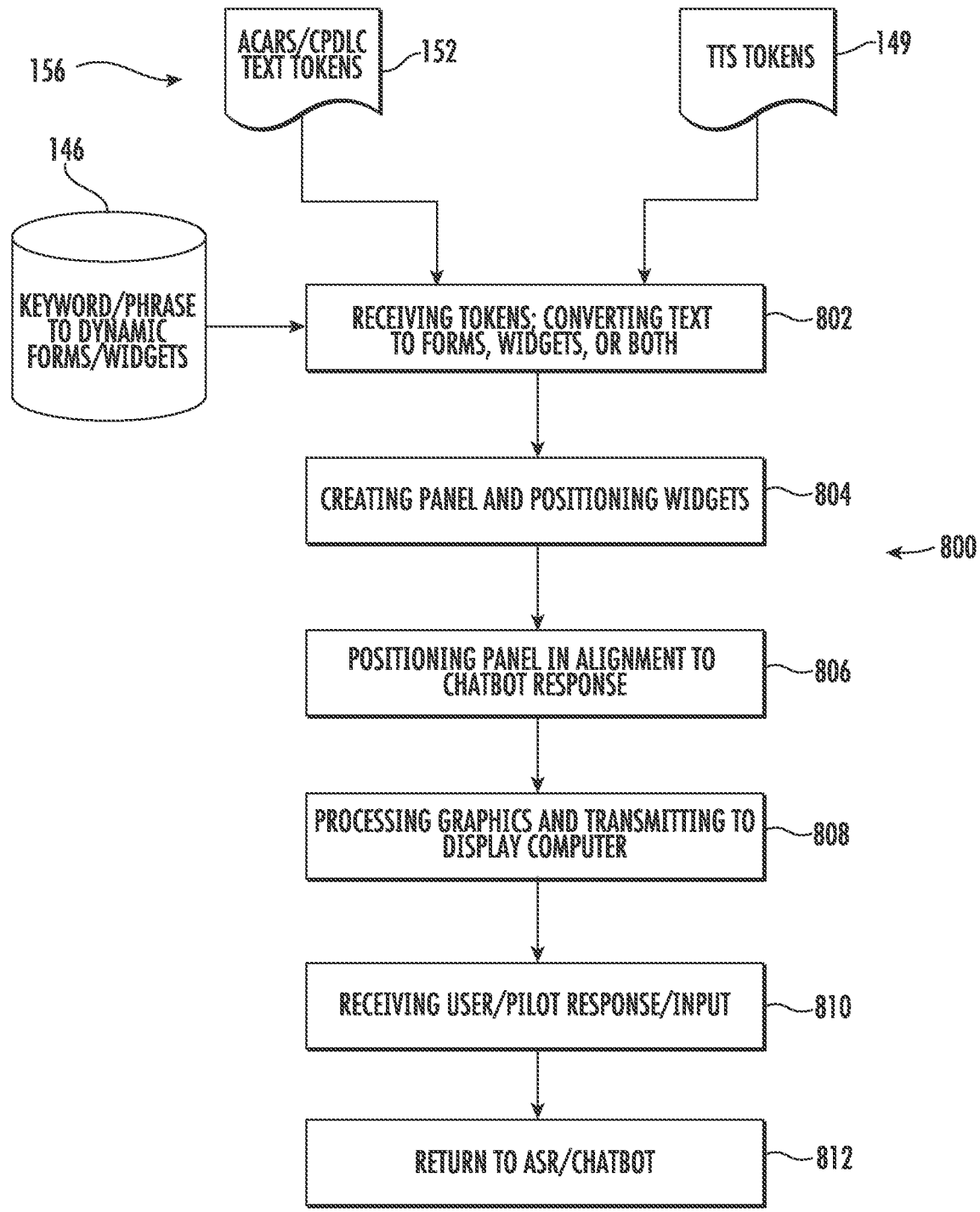
FIG. 8 is a flow chart of an example of a method of operation of a dynamic widget/form generator in accordance with an example of the present disclosure.
Figure 9A:
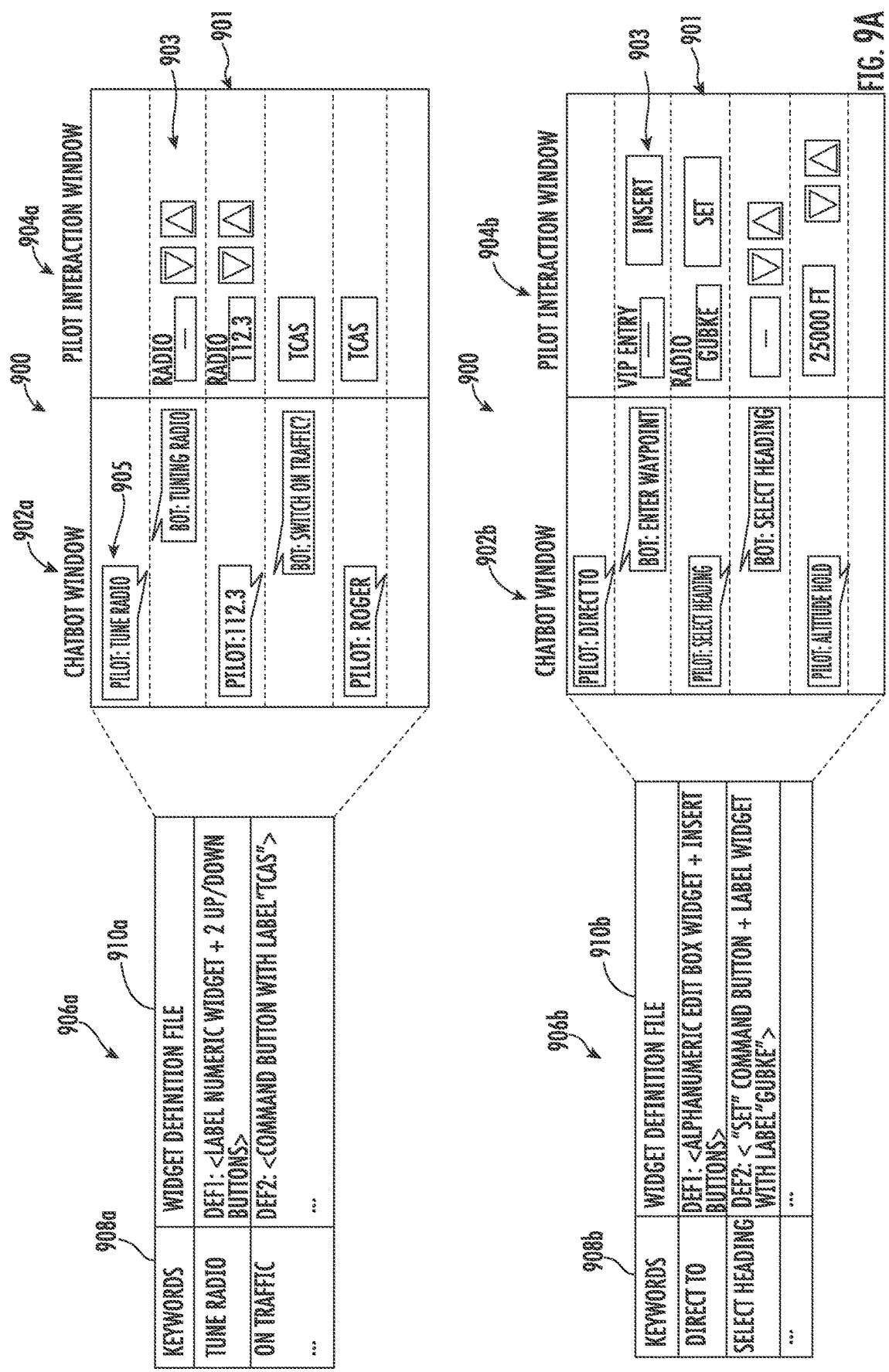
FIGS. 9A-9B are examples of chatbot windows and pilot interaction windows generated by a dynamic widget/form generator during a conversation in accordance with an example of the present disclosure.
Figure 9B:
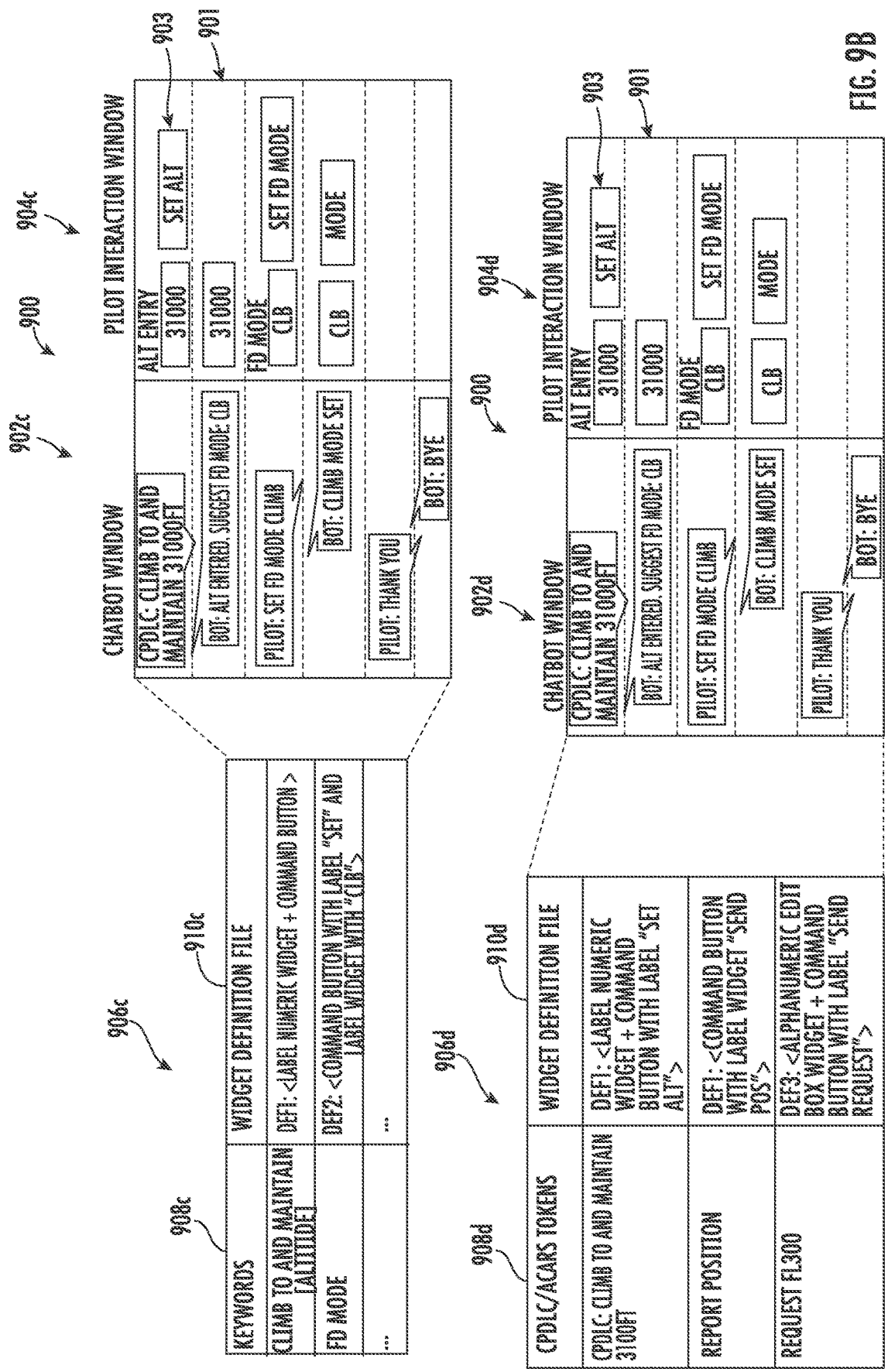

FIG. 8 is a flow chart of an example of a method 800 of operation of a dynamic widget/form generator 144 in accordance with an example of the present disclosure. In block 802, the method 800 includes receiving the tokens 149, 152 from the tokenizer 126, or a controller-pilot data link communications (CPDLC)/Aircraft Communication Addressing and Reporting System (ACARS) text analyzer 150 that receives text 156. The method 800 also includes converting text 156 to one or more forms, widgets or both. The text 156 is text tokens 152 or communication (COMM) tokens received from an Aircraft Communications Addressing and Reporting System (ACARS) and/or a Data Link/Controller-Pilot Data Link Communications (DL/CPDLC) text analyzer 150, or TTS tokens 149 received from a system directed conversation module 134 or dynamic conversational graph generator 128 via a tokenizer 126. The token or tokens are converted to graphical opcode/operand/formatted instructions by the dynamic widget/form generator 144 using a keyword/phrase to dynamic forms/widgets database 146. Referring also to FIGS. 9A and 9B, FIGS. 9A and 9B are examples of chatbot windows 902a-902d and a pilot interaction window 904a-904d generated by the dynamic widget/form generator 144 during a conversation in accordance with an example of the present disclosure. FIGS. 9A and 9B also illustrate tables 906a-906d including keywords 908a-908d and corresponding widget definition files 910a-910d. The tables 906a-906d are stored in the keyword/phrase to dynamic forms/widgets database 146 for use by the dynamic widget/form generator 144 to generate dynamic forms, widgets, or both as illustrated in the examples in chatbot widows 902-902d and pilot interaction windows 904a-904d.

In block 804, the method 800 includes creating a panel 901 and positioning widgets 903 within the panel 901 for pilot interaction window 904a-904d. In block 806, the method 800 includes positioning the panel 901 in pilot interaction window 904a-904d in alignment to the chatbot response in the chatbot window 902a-902d. In block 808, the method 800 includes processing the graphics and transmitting the graphics to the display computer 118 for presentation on the cockpit display 106, and/or transmitting the graphics to the aircraft interface device 120 for presentation on the portable electronic device 108.

In block 810, the method 800 includes receiving a response or input from the pilot 103. As previously described, the response or input is in the form of speech received by the system 100 from the pilot 103 and/or the pilot 103 interacting with a touchscreen 114 of the cockpit display 106 or touchscreen 116 of the portable electronic device 108. In block 812, the method 800 returns to the chatbot 102 and ASR device 122 to receive further responses or inputs from the pilot 103.

Figure 10:
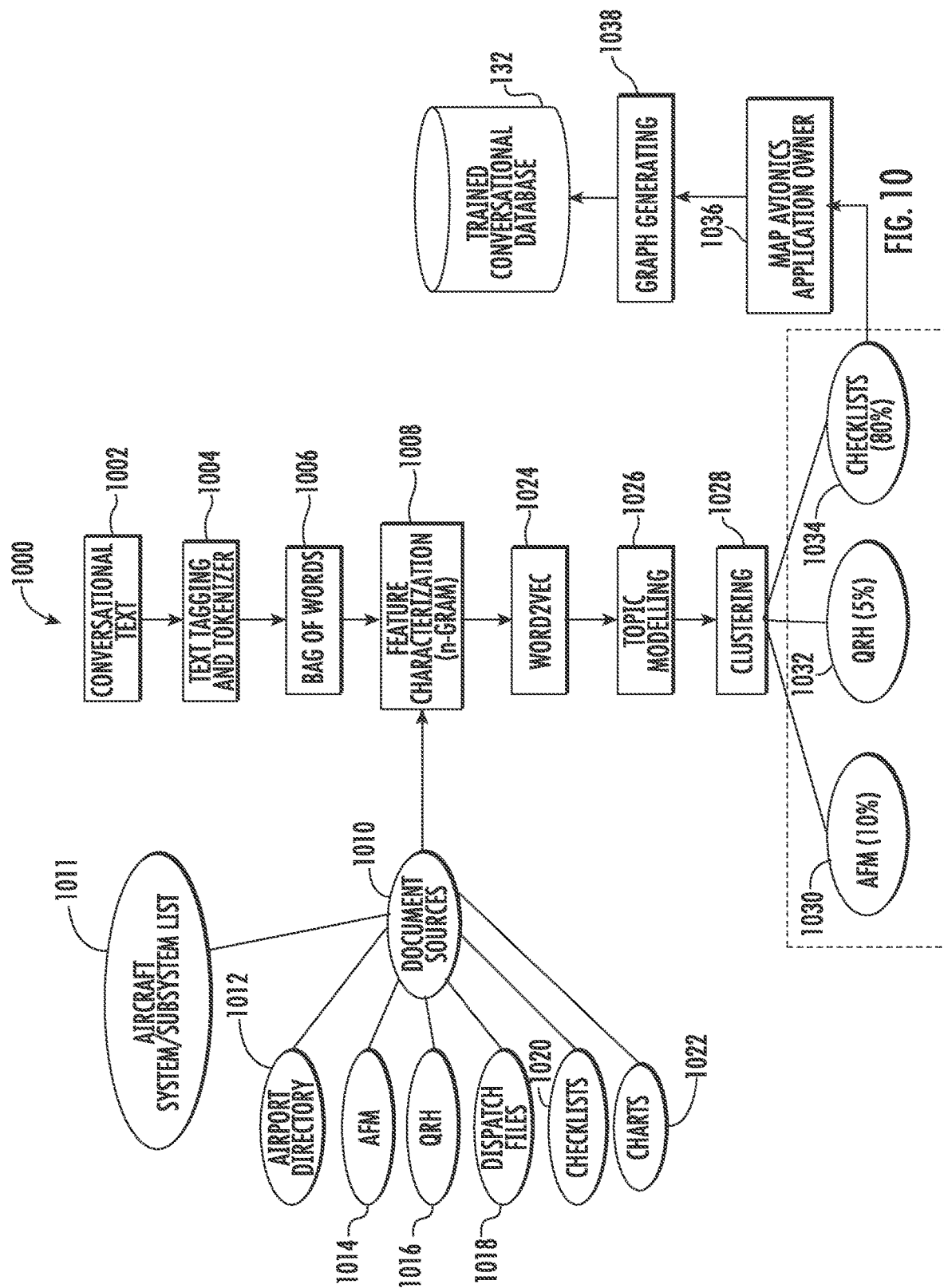
FIG. 10 is a flow chart of an example of a method for generating a historical/trained conversation database in accordance with an example of the present disclosure.

FIG. 10 is a flow chart of an example of a method 1000 for generating a historical/trained conversation database 132 in accordance with an example of the present disclosure. In block 1002, the method 1000 includes receiving conversational text, e.g., text is received from a pilot or other user. In block 1004, the method 1000 includes converting the text into tokens by the tokenizer.

In block 1006, the method 1000 includes creating a bag of words. Creating a bag of words is a process of representing text data when modeling text with a machine learning algorithm. The bag of words includes a vocabulary of known words, e.g., approach, phase, weather, destination, airport, radio, frequency, tuning, etc.

In block 1008, the method 1000 includes performing feature characterization using document sources 1010. Each word or phrase is referred to as a gram. Creating a vocabulary of two-words (n=2) pairs is, in turn, referred to as a bigram model, e.g., approach briefing, flight phase, approach checklist, destination airport, weather destination, etc. Examples of document sources 1010 for performing feature characterization include but are not limited to an aircraft system/subsystem list 1011, an airport directory 1012, an airplane flight manual (AFM) 1014, a quick reference handbook (QRH) 1016, dispatch files 1018, different checklists 1020, and aeronautical charts 1022. Examples of the aircraft system/subsystem list 1011 include are not limited to displays, a flight control system (FCS), a flight management system (FMS), maintenance system, etc.

In block 1024, the method 1000 includes performing word-to-vector (Word2Vec) conversions. Word associations are made from a large corpus of words. Word2Vec conversion represents each distinct word with a particular list of numbers called a vector. In Word2Vec conversion, each word or phrase originating from document sources 1010 and the inter-relationship between the words or phrases characterized in block 1008 are numerically represented as an array of numbers.

In block 1026, the method 1000 includes performing topic modeling. Topic modeling facilitates in the discovery of semantic structures in a text body by comparing the distance between the vectors in the word vector space to identify the topics. Topic modeling also includes extracting main topics from a dataset. Examples of semantic structures include but are not limited to weather, navigation, aircraft state, standard operating procedures (SOPs), etc.

In block 1028, the method 1000 includes clustering or grouping words or phrases into different clusters 1030-1034. Words or phrases that are related are grouped into the same cluster. Each clusters is then associated to a topic, e.g., similarity measurements are used to cluster related words, phrases or documents together. Examples of clusters include but are not limited to AFM cluster 1030, QRH cluster 1032, checklists cluster 1034, etc. For example, if conversational text is "Hey bot, can you get me the approach checklist." There is a high probability, e.g., about 80% chance to hit the checklists cluster 1034.

In block 1036, the method 1000 includes mapping to an avionic application owner in response to a keyword or keywords in the conversation text. In the example where the keywords are "approach checklist," the conversation is mapped to the display system which is the avionic application owner for displaying the approach checklist.

In block 1038, the method 1000 includes performing graph generation which builds the relationship with data elements within the cluster, between the clusters, and avionics application owners to necessary data elements in the form of a graph represented by a mesh comprising nodes and edges. This graph is stored and represented as a historical/trained conversation database 132, which is field loadable.

Figure 11:
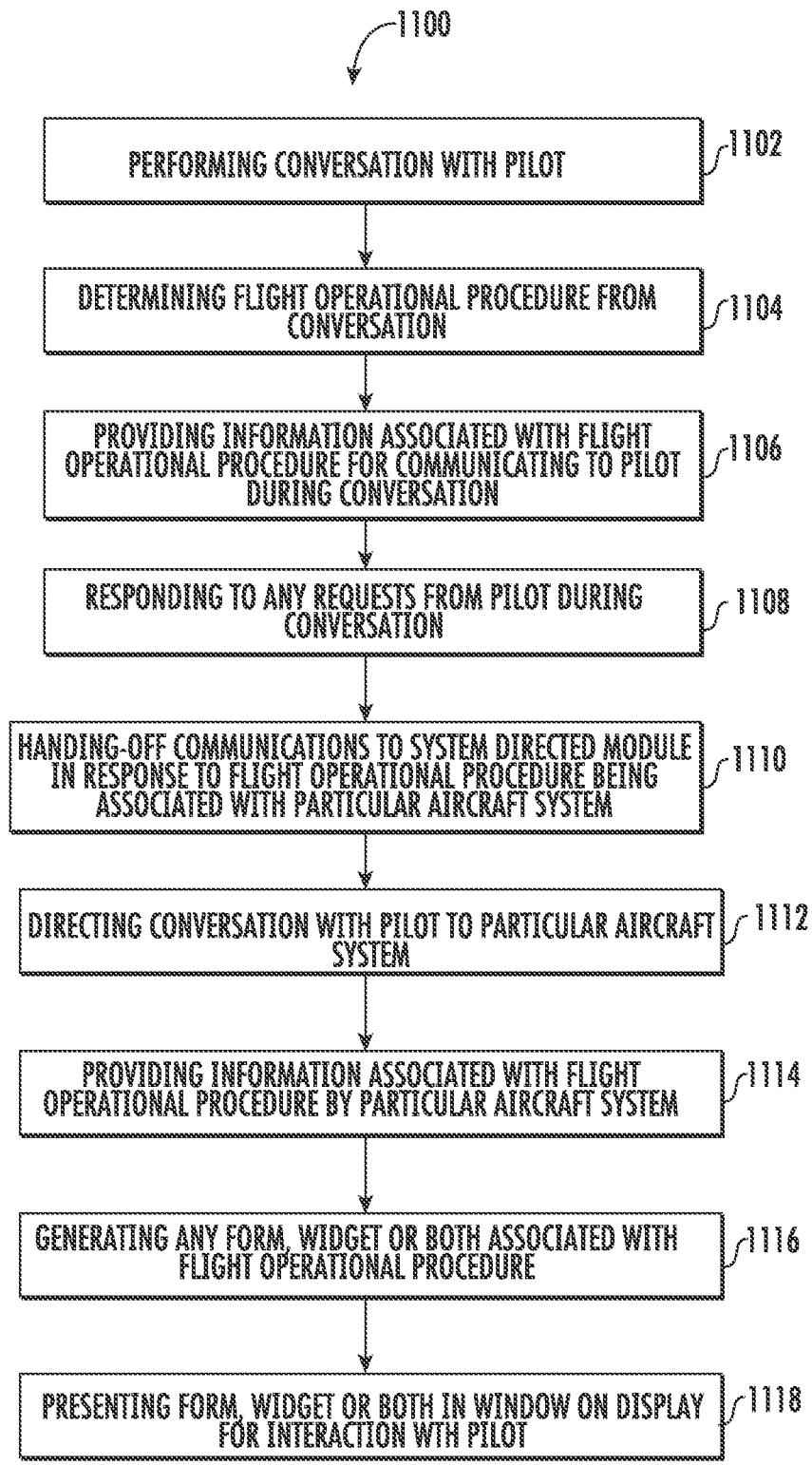
FIG. 11 is a flow chart of an example of a method for flight deck communications in accordance with an example of the present disclosure.

FIG. 11 is a flow chart of an example of a method 1100 for flight deck communications in accordance with an example of the present disclosure. In some examples, the method 1100 is embodied in and performed by the system 100 in FIGS. 1 and 2. In some examples, the set of functions 130 performed by the dynamic conversational graph generator 128, the set of functions 138 performed by the system directed conversation module 134, the set of functions 148 performed by the dynamic widget/form generator 144, and functions performed by other components of the system 100 as described herein are also included in the method 1100.

In block 1102, the method 1100 includes performing, by a chatbot, a conversation with a pilot. The conversation includes speech communications, visual communications using a display, or both.

In block 1104, the method 1100 includes determining, by a dynamic conversational graph generator, a flight operational procedure from the conversation with the pilot. In block 1106, the method 1100 includes providing, by the dynamic conversational graph generator, information associated with the flight operational procedure to the chatbot for communicating to the pilot. In block 1108, the method 1100 includes responding, by the dynamic conversational graph generator, to any requests received by the chatbot during the conversation with the pilot.

In block 1110, the method 1100 further includes handing-off communications to a system directed conversation module by the dynamic conversational graph generator in response to the flight operational procedure being associated with a particular aircraft system or avionics application owner. In block 1112, the method 1100 includes directing the conversation with the pilot to a particular aircraft system, e.g., one of aircraft systems 136a-136n in FIGS. 1 and 2.

In block 1114, the method 1100 includes providing, by the system directed conversation module or the particular aircraft system, the information associated with the flight operational procedure to the chatbot for communication to the pilot.

In block 1116, the method 1100 includes generating a particular form, widget or both associated with the flight operational procedure for presentation in a window on a display. The particular form, widget or both are configured for interaction with the pilot. Pilot interaction with the particular form, widget or both includes at least one of interaction by conversing with the chatbot or interaction by the pilot touching a feature of the particular form, widget, or both in a display or touchscreen.

In block 1118, the method 1100 includes presenting the form, widget or both in a window on the display for interaction with the pilot. In accordance with the example in FIGS. 1 and 2, the display includes the cockpit display 106, display of the portable electronic device 108, or both. The pilot interaction includes the pilot touching a touchscreen 114 of a cockpit display 106, the touchscreen 116 of a portable electronic device 108, or both. In some examples, the pilot interaction also includes speech communication with the form, widget or both using the audio panel 104, microphone 110, speaker 112, ASR device 122, TTS converter 124, chatbot 102 and tokenizer 126 in FIGS. 1 and 2.

Figure 12:
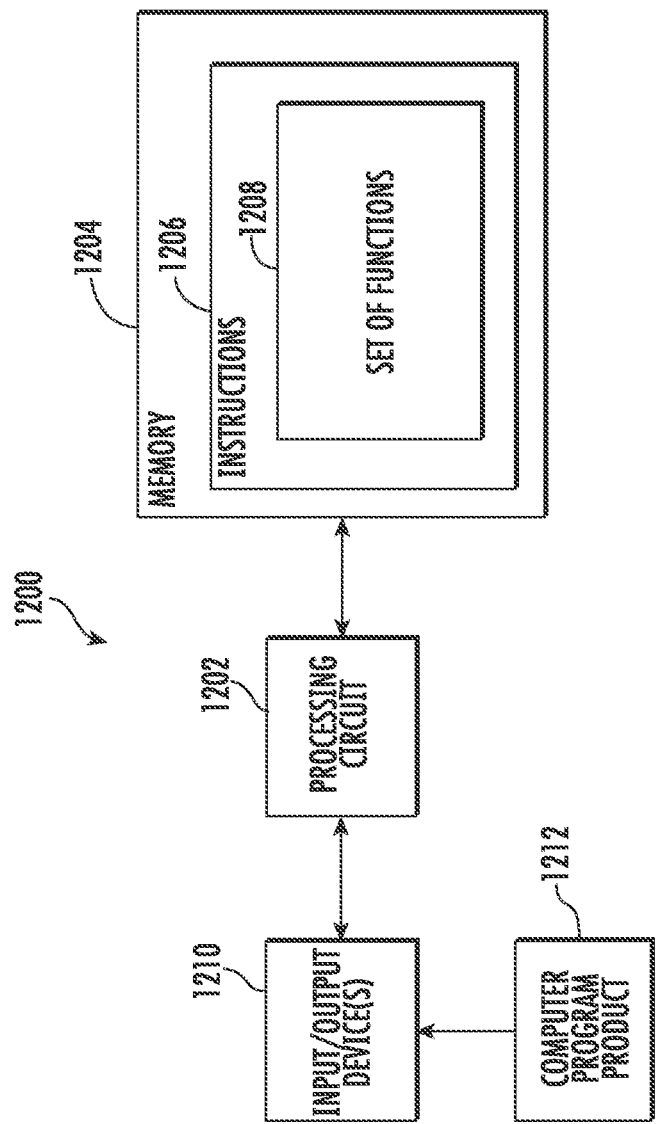
FIG. 12 is an example of a system for flight deck communications in accordance with an example of the present disclosure.

FIG. 12 is an example of a system 1200 for flight deck communications in accordance with an example of the present disclosure. In some examples, the system 100 in FIGS. 1 and 2 is embodied in one or more systems similar to or the same as the system 1200. In some examples, at least some of the components of the system 100 in FIGS. 1 and 2, e.g., the chatbot 102, the tokenizer 126, the dynamic conversational graph generator 128, the system directed conversation module 134, the command encoder/decoder 142, one or more of the aircraft systems 136, the dynamic widget/form generator 144, the DL/CPDLC/ACARS text analyzer 150, the aircraft interface device 120, and the display computer 118 are embodied in one or more systems similar to or the same as the system 1200. In some examples, at least some of the methods 300, 400, 500, 800, 1000, and 1100 are embodied in and performed by one or more systems similar to or the same as the system 1200.

The system 1200 includes a processing circuit 1202 and a memory 1204 associated with the processing circuit 1202. The memory 1204 includes computer-readable program instructions 1206 that, when executed by the processing circuit 1202 causes the processing circuit 1202 to perform a set of functions 1208. In some examples, the set of functions 1208 includes the set of functions 130 performable by the dynamic conversational graph generator 128, the set of functions 138 performable by the system directed conversation module 134, and/or the set of functions 148 performable by the dynamic widget/form generator 144. The sets of functions 130, 138 and 148 are embodied on one or more systems that are similar to or the same as the system 1200. In some examples, the set of functions 1208 includes at least some of the methods 300, 400, 500, 800, 1000 and 1100 that are embodied on and performed by one or more systems that are similar to or the same as the system 1200.

In some examples, the system 1200 also includes one or more input/output devices 1210. The input/output devices 1210 include separate input devices, output device or combination input and output devices. Examples of the input/output devices 1210 include but are not limited to one or more display devices, a touchscreen, microphone, speaker, keyboard or keypad, pointing device, and a device configured to read or access computer-readable program instructions on a computer program product 1212 similar to that described herein. Any of the methods 300, 400, 500, 800, 1000 and/or 1100 can be embodied on the computer program product 1212, read by the input/output device 1210 and stored in the memory 1204.

Further, the disclosure comprises examples according to the following clauses:

Clause 1. An interface system for flight deck communications, the interface system comprising:
    a chatbot configured to perform a conversation with a pilot, wherein the conversation comprises speech communications, visual communications using a display, or both; and
    a dynamic conversational graph generator configured to perform a set of functions comprising:
        determining a flight operational procedure from the conversation with the pilot;
        providing information associated with the flight operational procedure to the chatbot for communicating to the pilot; and
        responding to any requests received from the pilot by the chatbot during the conversation with the pilot.

Clause 2. The interface system of clause 1, further comprising a tokenizer configured to:
    convert text received from the chatbot to tokens transmitted by the tokenizer; and
    convert tokens received by the tokenizer to text that is transmitted to the chatbot to perform the conversation with the pilot.

Clause 3. The interface system of any of clauses 1 or 2, wherein the set of functions performed by the dynamic conversational graph generator further comprises:
    detecting a keyword in the conversation with the pilot using the tokens from the tokenizer, wherein the keyword identifies a particular flight operational procedure;
    searching a plurality of nodes of a dynamic conversational graph to identify a node corresponding to the keyword in the conversation with the pilot, wherein each node corresponds to a different flight operational procedure;
    handing-off communications to a system directed conversation module in response to the node corresponding to the keyword having an owner, wherein the owner is a particular aircraft system associated with the flight operational procedure; and
    determining an identification of any neighboring nodes in the dynamic conversational graph to the node corresponding to the keyword in response to the node not having an owner, wherein the identification of any neighboring nodes are communicated to the pilot by the chatbot in the conversation.

Clause 4. The interface system of any of clauses 1-2 or 3, wherein the set of functions performed by the dynamic conversational graph generator further comprises:
    searching neighboring nodes of the dynamic conversational graph to identify a certain neighboring node corresponding to another keyword during the conversation with the pilot; and
    handing-off communications to the system directed conversation module in response to the certain neighboring node having an associated owner.

Clause 5. The interface system of any of clauses 1-3 or 4, further comprising a system directed conversation module configured to provide certain tokens comprising particular information associated with the flight operational procedure to the tokenizer in response to the flight operational procedure being associated with a particular aircraft system of a plurality of aircraft systems, wherein the dynamic conversational graph generator is configured to handoff communications to the system directed conversation module in response to the flight operational procedure being associated with the particular aircraft system.

Clause 6. The interface system of any of clauses 1-4 or 6, wherein the system directed conversation module is configured to perform a set of functions comprising:
    receiving tokens from the tokenizer, the tokens comprising information associated with the flight operational procedure;
    querying the database for the flight operational procedure;
    determining the particular aircraft system of the plurality of aircraft systems for performing the flight operational procedure; and communicating information related to the flight operational procedure with the pilot through the tokenizer and the chatbot.

Clause 7. The interface system of any of clauses 1-5 or 6, further comprising a command encoder/decoder configured to:

receive and execute formatted instructions related to the flight operational procedure from the system directed conversation module for communications with the particular aircraft system of the plurality of aircraft systems; and decode the particular information from the particular aircraft system into a set of responses for communications with the system directed conversation module.

Clause 8. The interface system of any of clauses 1-7 or 7, further comprising a dynamic widget/form generator configured to perform a set of functions comprising:

receiving the tokens from the tokenizer, or a controller-pilot data link communications (CPDLC)/Aircraft Communication Addressing and Reporting System (ACARS) text analyzer that receives text; and generating a particular form, widget or both in response to the tokens.

Clause 9. The interface system of any of clauses 1-7 or 8, further comprising a system directed conversation module configured to direct the conversation with the pilot to a particular aircraft system associated with the flight operational procedure, wherein the dynamic conversational graph generator is configured to handoff communications to the system directed conversation module in response to the flight operational procedure being associated with the particular aircraft system of a plurality of aircraft systems.

Clause 10. The interface system of any of clauses 1-8 or 9, further comprising a dynamic widget/form generator configured to generate a particular form, widget or both associated with the flight operational procedure for presentation in a window on a display, wherein the particular form, widget or both are configured for interaction with the pilot.

Clause 11. The interface system of any of clauses 1-9 or 10, wherein a visual positioning or alignment of the particular form, widget or both associated with the flight operational procedure is correlated to a corresponding visual chatbot conversational text.

Clause 12. The interface system of any of clauses 1-10 or 11, wherein pilot interaction with the particular form, widget or both comprises at least one of interaction by conversing with the chatbot or interaction by the pilot touching a feature of the particular form, widget, or both.

Clause 13. The interface system of any of clauses 1-11 or 12, further comprising:

an automatic speech recognition device configured to receive speech from the pilot and to convert the speech to text for transmission to the chatbot; and a text-to-speech converter configured to receive text from the chatbot and to convert the text to speech for transmission to the pilot by a speaker, wherein the speaker is in a flight deck or a headset of the pilot.

Clause 14. The interface system of any of clauses 1-12 or 13, wherein the chatbot is configured to perform the conversation with the pilot using at least one of an audio panel in a flight deck, a cockpit display in the flight deck, or a portable electronic device.

Clause 15. A method for flight deck communications, comprising:

performing, by a chatbot, a conversation with a pilot, wherein the conversation comprises speech communications, visual communications using a display, or both;

determining, by a dynamic conversational graph generator, a flight operational procedure from the conversation with the pilot;

providing, by the dynamic conversational graph generator, information associated with the flight operational procedure to the chatbot for communicating to the pilot; and responding, by the dynamic conversational graph generator, to any requests from the pilot received by the chatbot during the conversation with the pilot.

Clause 16. The method of clause 15 and any of the preceding clauses, further comprising:

handing-off communications to a system directed conversation module by the dynamic conversational graph generator in response to the flight operational procedure being associated with a particular aircraft system; and providing, by the system directed conversation module, the information associated with the flight operational procedure to the chatbot for communication to the pilot.

Clause 17. The method of clause 15 or 16, further comprising:

detecting a keyword in the conversation with the pilot using tokens from a tokenizer, wherein the keyword identifies a particular flight operational procedure;

searching a plurality of nodes of a dynamic conversational graph to identify a node corresponding to the keyword in the conversation with the pilot, wherein each node corresponds to a different flight operational procedure;

handing-off communications to a system directed conversation module in response to the node corresponding to the keyword having an owner, wherein the owner is a particular aircraft system associated with the flight operational procedure; and determining an identification of any neighboring nodes in the dynamic conversational graph to the node corresponding to the keyword in response to the node not having an owner, wherein the identification of any neighboring nodes are communicated to the pilot by the chatbot in the conversation.

Clause 18. The method of any of clauses 15-16 or 17, further comprising:

converting, by a tokenizer, text received from the chatbot to tokens; and converting tokens received by the tokenizer to text that is transmitted to the chatbot to perform the conversation with the pilot.

Clause 19. The method of any of clauses 15-17 or 18, further comprising:

providing, by a system directed conversation module, tokens comprising the information associated with the flight operational procedure to the tokenizer in response to the flight operational procedure being associated with a particular aircraft system, wherein the dynamic conversational graph generator is configured to handoff communications to the system directed conversation module in response to the flight operational procedure being associated with the particular aircraft system.

Clause 20. The method of any of clauses 15-18 or 19, further comprising generating a particular form, widget or both associated with the flight operational procedure for presentation in a window on a display, wherein the particular form, widget or both are configured for interaction with the pilot, wherein pilot interaction with the particular form, widget or both comprises at least one of interaction by conversing with the chatbot or interaction by the pilot touching a feature of the particular form, widget, or both.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular examples only and is not intended to be limiting of examples of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present examples has been presented for purposes of illustration and description, but is not intended to be exhaustive or limited to examples in the form disclosed. Many modifications and variations will be apparent to those of ordinary skill in the art without departing from the scope and spirit of examples.

Although specific examples have been illustrated and described herein, those of ordinary skill in the art appreciate that any arrangement which is calculated to achieve the same purpose may be substituted for the specific examples shown and that the examples have other applications in other environments. This application is intended to cover any adaptations or variations. The following claims are in no way intended to limit the scope of examples of the disclosure to the specific examples described herein.

What is claimed is:

1. An interface system for flight deck communications, the interface system comprising:
   a chatbot configured to perform a conversation with a pilot, wherein the conversation comprises speech communications, visual communications using a display, or both; and
   a dynamic conversational graph generator configured to perform a set of functions comprising:
      determining a flight operational procedure from the conversation with the pilot;
      providing information associated with the flight operational procedure to the chatbot for communicating to the pilot; and
      responding to any requests received from the pilot by the chatbot during the conversation with the pilot.

2. The interface system of claim 1, further comprising a tokenizer configured to:
   convert text received from the chatbot to tokens transmitted by the tokenizer; and
   convert tokens received by the tokenizer to text that is transmitted to the chatbot to perform the conversation with the pilot.

3. The interface system of claim 2, wherein the set of functions performed by the dynamic conversational graph generator further comprises:
   detecting a keyword in the conversation with the pilot using the tokens from the tokenizer, wherein the keyword identifies a particular flight operational procedure;
   searching a plurality of nodes of a dynamic conversational graph to identify a node corresponding to the keyword in the conversation with the pilot, wherein each node corresponds to a different flight operational procedure;
   handing-off communications to a system directed conversation module in response to the node corresponding to the keyword having an owner, wherein the owner is a particular aircraft system associated with the flight operational procedure; and
   determining an identification of any neighboring nodes in the dynamic conversational graph to the node corresponding to the keyword in response to the node not having an owner, wherein the identification of any neighboring nodes are communicated to the pilot by the chatbot in the conversation.

4. The interface system of claim 3, wherein the set of functions performed by the dynamic conversational graph generator further comprises:
   searching neighboring nodes of the dynamic conversational graph to identify a certain neighboring node corresponding to another keyword during the conversation with the pilot; and
   handing-off communications to the system directed conversation module in response to the certain neighboring node having an associated owner.

5. The interface system of claim 2, further comprising a system directed conversation module configured to provide certain tokens comprising particular information associated with the flight operational procedure to the tokenizer in response to the flight operational procedure being associated with a particular aircraft system of a plurality of aircraft systems, wherein the dynamic conversational graph generator is configured to handoff communications to the system directed conversation module in response to the flight operational procedure being associated with the particular aircraft system.

6. The interface system of claim 5, wherein the system directed conversation module is configured to perform a set of functions comprising:
   receiving tokens from the tokenizer, the tokens comprising information associated with the flight operational procedure;
   querying a database for the flight operational procedure;
   determining the particular aircraft system of the plurality of aircraft systems for performing the flight operational procedure; and
   communicating information related to the flight operational procedure with the pilot through the tokenizer and the chatbot.

7. The interface system of claim 5, further comprising a command encoder/decoder configured to:
   receive and execute formatted instructions related to the flight operational procedure from the system directed conversation module for communications with the particular aircraft system of the plurality of aircraft systems; and decode the particular information from the particular aircraft system into a set of responses for communications with the system directed conversation module.

8. The interface system of claim 2, further comprising a dynamic widget/form generator configured to perform a set of functions comprising:

receiving the tokens from the tokenizer, or a controller-pilot data link communications (CPDLC)/Aircraft Communication Addressing and Reporting System (ACARS) text analyzer that receives text; and generating a particular form, widget or both in response to the tokens.

9. The interface system of claim 1, further comprising a system directed conversation module configured to direct the conversation with the pilot to a particular aircraft system associated with the flight operational procedure, wherein the dynamic conversational graph generator is configured to handoff communications to the system directed conversation module in response to the flight operational procedure being associated with the particular aircraft system of a plurality of aircraft systems.

10. The interface system of claim 1, further comprising a dynamic widget/form generator configured to generate a particular form, widget or both associated with the flight operational procedure for presentation in a window on a display, wherein the particular form, widget or both are configured for interaction with the pilot.

11. The interface system of claim 10, wherein a visual positioning or alignment of the particular form, widget or both associated with the flight operational procedure is correlated to a corresponding visual chatbot conversational text.

12. The interface system of claim 10, wherein pilot interaction with the particular form, widget or both comprises at least one of interaction by conversing with the chatbot or interaction by the pilot touching a feature of the particular form, widget, or both.

13. The interface system of claim 1, further comprising:
an automatic speech recognition device configured to receive speech from the pilot and to convert the speech to text for transmission to the chatbot; and
a text-to-speech converter configured to receive text from the chatbot and to convert the text to speech for transmission to the pilot by a speaker, wherein the speaker is in a flight deck or a headset of the pilot.

14. The interface system of claim 1, wherein the chatbot is configured to perform the conversation with the pilot using at least one of an audio panel in a flight deck, a cockpit display in the flight deck, or a portable electronic device.

15. A method for flight deck communications, comprising:
performing, by a chatbot, a conversation with a pilot, wherein the conversation comprises speech communications, visual communications using a display, or both;
determining, by a dynamic conversational graph generator, a flight operational procedure from the conversation with the pilot;

providing, by the dynamic conversational graph generator, information associated with the flight operational procedure to the chatbot for communicating to the pilot; and responding, by the dynamic conversational graph generator, to any requests from the pilot received by the chatbot during the conversation with the pilot.

16. The method of claim 15, further comprising:
handing-off communications to a system directed conversation module by the dynamic conversational graph generator in response to the flight operational procedure being associated with a particular aircraft system; and
providing, by the system directed conversation module, the information associated with the flight operational procedure to the chatbot for communication to the pilot.

17. The method of claim 15, further comprising:
detecting a keyword in the conversation with the pilot using tokens from a tokenizer, wherein the keyword identifies a particular flight operational procedure;
searching a plurality of nodes of a dynamic conversational graph to identify a node corresponding to the keyword in the conversation with the pilot, wherein each node corresponds to a different flight operational procedure;
handing-off communications to a system directed conversation module in response to the node corresponding to the keyword having an owner, wherein the owner is a particular aircraft system associated with the flight operational procedure; and
determining an identification of any neighboring nodes in the dynamic conversational graph to the node corresponding to the keyword in response to the node not having an owner, wherein the identification of any neighboring nodes are communicated to the pilot by the chatbot in the conversation.

18. The method of claim 15, further comprising:
converting, by a tokenizer, text received from the chatbot to tokens; and
converting tokens received by the tokenizer to text that is transmitted to the chatbot to perform the conversation with the pilot.

19. The method of claim 18, further comprising:
providing, by a system directed conversation module, tokens comprising the information associated with the flight operational procedure to the tokenizer in response to the flight operational procedure being associated with a particular aircraft system, wherein the dynamic conversational graph generator is configured to handoff communications to the system directed conversation module in response to the flight operational procedure being associated with the particular aircraft system.

20. The method of claim 15, further comprising generating a particular form, widget or both associated with the flight operational procedure for presentation in a window on a display, wherein the particular form, widget or both are configured for interaction with the pilot, wherein pilot interaction with the particular form, widget or both comprises at least one of interaction by conversing with the chatbot or interaction by the pilot touching a feature of the particular form, widget, or both.

* * * * *